(12) United States Patent
Tada et al.

(10) Patent No.: US 9,622,406 B2
(45) Date of Patent: Apr. 18, 2017

(54) MID-MOUNT MOWER WITH POWER TRANSMISSION COUPLING

(71) Applicant: Kubota Corporation, Osaka-shi (JP)

(72) Inventors: Hiroyuki Tada, Sakai (JP); Akira Minoura, Sakai (JP); Takeshi Komorida, Sakai (JP); Azusa Furihata, Sakai (JP); Hiroshi Kawabata, Sakai (JP); Ryo Matsumoto, Sakai (JP)

(73) Assignee: Kubota Corporation, Osaka (JP)

( * ) Notice: Subject to any disclaimer, the term of this patent is extended or adjusted under 35 U.S.C. 154(b) by 142 days.

(21) Appl. No.: 14/489,981

(22) Filed: Sep. 18, 2014

(65) Prior Publication Data

US 2015/0181803 A1    Jul. 2, 2015

(30) Foreign Application Priority Data

Dec. 27, 2013   (JP) ................................ 2013-272821
Aug. 4, 2014   (JP) ................................ 2014-158726

(51) Int. Cl.

| *A01D 34/74* | (2006.01) |
| *A01D 67/00* | (2006.01) |
| *A01D 34/66* | (2006.01) |
| *A01D 34/64* | (2006.01) |

(52) U.S. Cl.
CPC ........... *A01D 34/661* (2013.01); *A01D 34/64* (2013.01); *A01D 67/005* (2013.01)

(58) Field of Classification Search
USPC ........ 56/14.7, 14.9, 15.3, 15.6–15.8, DIG. 9, 56/14, 22
See application file for complete search history.

(56) References Cited

U.S. PATENT DOCUMENTS

| 4,817,728 A * | 4/1989 | Schmid ................ A01B 59/042 172/273 |
| 5,528,886 A * | 6/1996 | Esau ..................... A01B 59/042 280/455.1 |
| 5,528,889 A * | 6/1996 | Kure ...................... A01D 34/64 56/15.6 |
| 6,470,660 B1 * | 10/2002 | Buss ....................... A01D 34/64 56/15.9 |

(Continued)

FOREIGN PATENT DOCUMENTS

| JP | S63193411 U | 12/1988 |
| JP | H0482919 U | 7/1992 |

(Continued)

*Primary Examiner* — Alicia Torres
(74) *Attorney, Agent, or Firm* — The Webb Law Firm

(57) ABSTRACT

A mid-mount mower has a mower unit mounted under a vehicle body between front wheels and rear wheels. The mower includes a lift link mechanism having a front link and a rear link, an intermediate structure interconnecting one end of the front link and one end of the rear link via a pivot axis, a blade housing having an engaged portion engageable with an engaging potion of the intermediate structure and a guide face configured to guide the engaging portion ad the engaged portion to an engaging position so as to establish connection between the blade housing placed on a ground surface and the intermediate structure in association with a movement of the vehicle body in a front/rear direction.

11 Claims, 28 Drawing Sheets

(56) References Cited

U.S. PATENT DOCUMENTS 7,278,502 B2 * 10/2007 Trefz .................. A01B 71/063
180/53.1
7,877,972 B2    2/2011  Fox et al.
8,234,847 B2    8/2012  Fox et al.

FOREIGN PATENT DOCUMENTS

| JP | 4110428 U | 9/1992 |
| JP | H06253639 A | 9/1994 |
| JP | H0984429 A | 3/1997 |
| JP | 10339169 A | 12/1998 |

* cited by examiner

MID-MOUNT MOWER WITH POWER TRANSMISSION COUPLING

BACKGROUND OF THE INVENTION

1. Field of the Invention

The present invention relates to a mid-mount mower having a mower unit disposed under a vehicle body between front wheels and rear wheels.

2. Description of the Related Art

In a mid-mount mower, a blade housing covering a rotary blade is connected to a lift link mechanism having a front link and a rear link attached to a vehicle body and spaced apart from each other in a vehicle front/rear direction. With this, the blade housing can be lifted up/down between a lowered working position and an elevated non-working position. When a maintenance/inspection of the mower unit or an operation other than a grass mowing operation is to carried out, the mower unit is dismounted from the vehicle body. It is very troublesome to carry out a connecting/disconnecting operation thereof in a limited space between the front wheels and the rear wheels. For this reason, it has been proposed to carry out at least some steps of the connecting/disconnecting operation in an automated manner.

For instance, in the case of a mid-mount mower disclosed in Japanese Unexamined Utility Model Application Publication No. 4-110428 (FIG. 1, FIG. 3) (Patent Document 1), in association with a forward traveling of the vehicle body, left and right front wheels roll over a blade housing, with utilizing a front wheel guide plate of this blade housing, to be positioned eventually at the body portion of a tractor. Then, in association with a final forward traveling, connection pins provided at free ends of a pair of left and right rear links are guided by openings formed at hook portions of a pair of left and right support stays provided in the blade housing and engaged into the deepest parts thereof. Then, lock arms provided in the respective support stays come into engagement with the connection pins with spring action, thus retaining the connection pins against inadvertent removal thereof, whereby the respective connection pins provided on the side of the vehicle body are connected to the respective support stays provided on the side of the mower. Thereafter, with establishment of connection between the front link and the front-side support stays, the connecting operation is completed. With the connecting arrangement disclosed in this Patent Document 1, connection of the front link needs to be carried out manually after connection of the rear link. After the connection pins of the pair of left and right rear links are guided by the openings of the hook portions of the blade housing and engaged into the deepest parts thereof, connection is established between the vehicle body and the blade housing. Simultaneously, engagement is established also between a clutch driving member of the vehicle body and a clutch driven member of the blade housing, thus enabling power transmission from the vehicle body to the blade housing. Under this condition, as lock arms provided in the respective support stays come into engagement with the connection pins by a spring action, thereby to retain the connection pins against inadvertent removal thereof, the respective pins of the vehicle body are connected to the respective support stays of the mower. Thereafter, with establishment of connection between the front links and the front-side support stays, the connecting operation is completed. In this way, in the case of the connecting arrangement disclosed in this Patent Document 1, connection between the vehicle body and the blade housing and connection for power transmission are effected simultaneously.

In Japanese Unexamined Patent Application Publication No. 10-339169 (FIG. 3, FIG. 4), there is disclosed an arrangement in which a hitch pin provided in a front link and a hitch pin provided in a rear link are automatically connected simultaneously with front and rear hitch brackets (support stays) provided in a mower deck (blade housing). However, with this arrangement, in the hitch brackets, there are only formed elongate holes opened along the vehicle body front/rear direction. Thus, for this connecting operation, a high-precision positioning is required between the mower deck and the vehicle body. Further, as an automatic connection arrangement relative to the mower deck is incorporated in a lift link mechanism, restriction is imposed on the designing of the structure of the lift link mechanism. For this reason, this automatic connection arrangement cannot be directly retrofitted with a conventional existing lift link mechanism. Moreover, with this connection arrangement, three points of the front-side hitch pin, the rear-side hitch pin and an output shaft side coupling need to be positioned with precision in three-dimensional manner with three points of the front-side hitch bracket, the rear-side hitch bracket and an input shaft side coupling, respectively. Hence, this connecting operation is difficult.

The U.S. Pat. No. 7,877,972 (FIG. 2, FIG. 4) and the U.S. Pat. No. 823,487 (FIG. 2, FIG. 4) too disclose automatic connection arrangements between a lift link mechanism and a mower deck (blade housing), including an automatic connection of power transmission paths. However, in these arrangements too, the automatic connection arrangement for the mower deck is integrally incorporated in the lift link mechanism. This results in specialization or peculiarity of the link mechanism per se. Thus, when this automatic connection arrangement is employed, it is difficult to use a conventional lift link mechanism without any modification thereof. Further, as connection between the vehicle body and the blade housing and connection for power transmission need to be established simultaneously, a high skill and/or experience is required for the connecting operation.

SUMMARY OF THE INVENTION

In view of the above-described states of the art, there is a need for a mid-mount mower allowing facilitated connection arrangement between a vehicle body and a mower unit and connection arrangement of power transmission mechanism from the vehicle body to the mower unit and providing high reliability in effecting both of these connections. In accomplishing this object, it is also desired not to impose any substantial structural restraint on a conventional existing lift link mechanism.

According to one exemplary inventive mid-mount mower having a mower unit mounted under a vehicle body between front wheels and rear wheels, the mower comprises:

a lift link mechanism having a front link and a rear link provided in the vehicle body and spaced apart from each other in a vehicle body front/rear direction;

an intermediate structure interconnecting one end of the front link and one end of the rear link via a pivot axis;

a blade housing having an engaged portion engageable with an engaging portion of the intermediate structure; and a guide face configured to guide the engaging portion and the engaged portion to an engaging position in association with a movement of the vehicle body in the vehicle body front/rear direction so as to establish connection between the blade housing placed on a ground surface and the intermediate structure.

With the above arrangement, for realization of automatic connection of the blade housing to the lift link mechanism, there is provided an intermediate structure for mediating establishment of this connection between the link mechanism and the blade housing. Relative to the lift link mechanism, this intermediate structure is only connected pivotally to one end of the front link and one end of the rear link, which links together constituting the lift link mechanism. And, the engaging portion and the engaged portion used for automatic connection with the blade housing are provided in the intermediate structure and the blade housing, respectively. Therefore, essentially, it is also possible to use a conventional existing lift link mechanism as it is. Further, positioning or alignment between the engaging portion and the engaged portion at the time of connection establishment is guided by the guide face. Thus, a certain amount of positioning error can be tolerated in the movement of the vehicle body in the front/rear direction, so that the trouble for the driver of the vehicle body can be alleviated.

According to another exemplary inventive mid-mount mower having a mower unit mounted under a vehicle body between front wheels and rear wheels, the mower comprises:
a lift link mechanism having a front link and a rear link and configured to suspend the mower unit;
a blade housing having an engaged portion engageable with an engaging portion provided in the vehicle body in association with a movement of the vehicle body in a vehicle body front/rear direction;
a blade power transmission mechanism having a vehicle body side power transmission mechanism and a mower side power transmission mechanism as units separate from each other and having also a power coupling mechanism for coupling an output shaft of the vehicle body side power transmission mechanism with an input shaft of the mower side power transmission mechanism; and
a coupling operational tool for establishing coupling between the input shaft and the output shaft by displacing the power coupling mechanism in the vehicle body front/rear direction.

With the above arrangement, in association with a movement of the vehicle body in the vehicle body front/rear direction, firstly, the engaging portion provided on the side of the vehicle body comes into engagement with the engaged portion provided on the side of the blade housing. Upon establishment of this engagement between the engaging portion and the engaged portion, connection between the vehicle body and the mower unit is realized. As a result, the vehicle body and the blade housing are fixed in position relative to each other. Therefore, the subsequent coupling operation between the input shaft and the output shaft by the power coupling mechanism using the coupling operational tool can be carried out smoothly. That is, connection between the vehicle body and the mower unit and the connection of the power transmission mechanism from the vehicle body side to the mower unit side are effected in two steps, so that the connecting/mounting operation of the mower unit to the vehicle body can be carried out in a reliable manner.

DETAILED DESCRIPTION OF THE PREFERRED EMBODIMENTS

First Embodiment

Figure 1A:
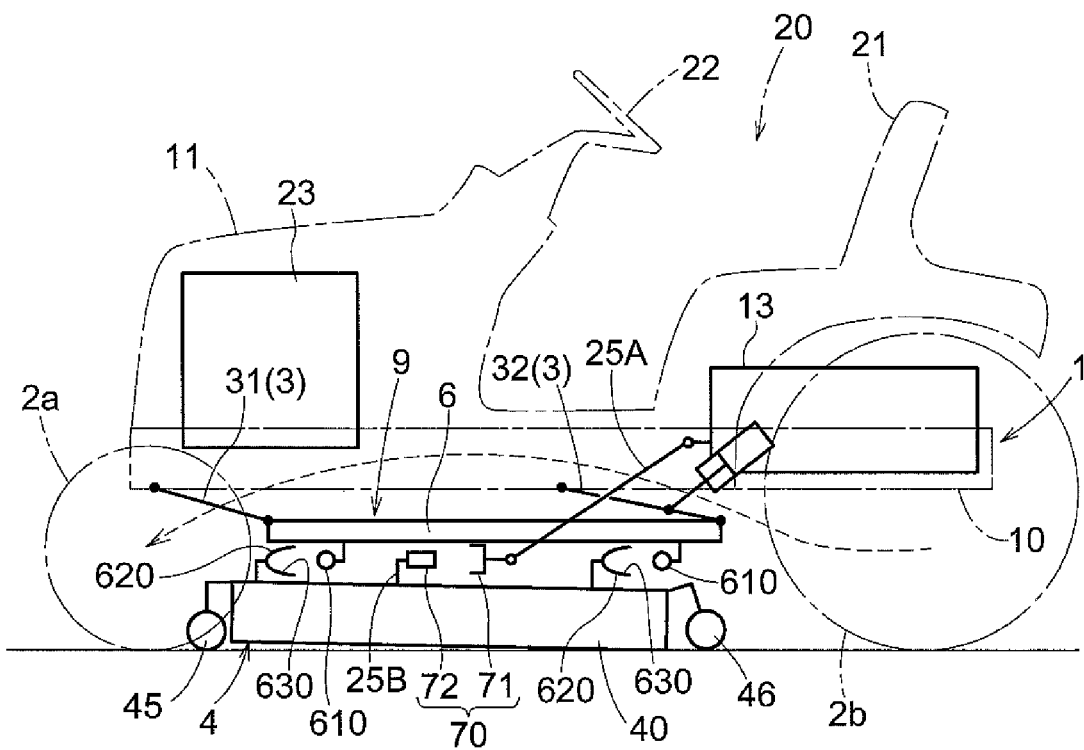
FIG. 1A is a schematic for explaining a first basic configuration of a mid-mount mower according to the present invention, showing a state immediately before an intermediate structure mower unit 4 is connected to a vehicle body.

Before a specific configuration of a first embodiment of a mid-mount mower according to the present invention is explained, a basic arrangement characterizing the present invention will be explained with reference to FIG. 1A and FIG. 1B. A mid-mount mower (to be referred to simply as "mower" hereinafter) shown in FIG. 1A and FIG. 1B allows mounting of a mower unit 4 between front wheels 2a and rear wheels 2b under a vehicle body 1 having a vehicle body frame 10 as a principal constituent thereof. Downwardly of the vehicle body 1, there is provided a lift link mechanism 3 consisting of a pair of left and right front links 31 and a pair of left and right rear links 32. Via free ends of the front links 31 and free ends of the rear links 32, an intermediate structure 6 is suspended. As the free ends of the front links 31 and the free ends of the rear links 32 are connected to the intermediate structure 6 via pivotal axes, in association with a pivotal movement of the lift link mechanism 3, the intermediate structure 6 is lifted up/down relative to a ground surface. That is, the lift link mechanism 3 and the intermediate structure 6 together constitute an upper structure 9 for mounting the mower unit 4 to the vehicle body 1. In this case, via this upper structure 9, detachable connection is realized with a blade housing 40 as a principal component of the mower unit 4. More particularly, on one hand, the upper structure 9 functions as an adaptor for interconnecting the vehicle body 1 and the mower unit 4, with allowing the latter to be lifted up/down relative to the former. On the other hand, the intermediate structure 6 functions as an adaptor for connecting the lift link mechanism 3 to the mower unit 4. For this reason, the intermediate structure 6 includes engaging portions 610, whereas the blade housing 40 of the mower unit 4 includes engaged portions 620 engage able with the engaging portions 610.

FIG. 1A shows a state immediate before establishment of connection between the intermediate structure 6 and the mower unit 4. FIG. 1B shows a state after the connection establishment. The trajectory of the front wheel 2a at the time of connection is illustrated by a dotted line in FIG. 1A. As may be understood from the FIG. 1A and FIG. 1B illustrations, as the mower travels to ride over the mower unit 4 placed still on the ground surface with lateral orientation, the engaging portions 610 of the intermediate structure 6 come into engagement with the engaged portions 620 of the blade housing 40, whereby connection is established between the mower unit 4 and the intermediate structure 6. As a result, connection is realized between the mower unit 4 and the vehicle body 1 of the mower. For facilitating the above-described engagement between the engaging portions 610 of the intermediate structure 6 and the engaged portions 620 of the blade housing 40 in association with a movement of the vehicle body 1 in the vehicle body front/rear direction, guide faces 630 for guiding the engaging portions 610 to engagement positions for the engagement with the engaged portions 620 are formed in one or both of the intermediate structure 6 and the mower unit 4.

The mode or form of engagement between the engaging portion 610 and the engaged portion 620 can vary in many ways. As one having a simple arrangement, a hole (slit)-pin engagement arrangement is preferably used which consists of an elongate slot extending in the vehicle body moving direction and an engaging pin engageable into this elongate slot. Alternatively, as another preferred arrangement, a recess-ball arrangement can be cited which consists of a curved recess opened in the vehicle body moving direction and a ball member coming into this curved recess. As a simple form of the guide face 630, an inclined face can be used which is inclined relative to the vehicle body moving direction and configured to provide guiding to an appropriate position in association with traveling of the vehicle body. Especially, if such inclined face is provided in one or both of the engaging portion 610 and the engaged portion 620, the arrangement can be simplified advantageously.

In general, the mower unit 4 has no power source of its own. Therefore, power from an engine 23 mounted on the mower is received via a working power transmission mechanism 25 to rotate a blade 43 provided in the blade housing 40. This working power transmission mechanism 25 includes a vehicle body side power transmission mechanism 25A and a mower side power transmission mechanism 25B as separate units. In operation, when connection is established between a free shaft end (to be referred to also as "output shaft" hereinafter) of the vehicle body side power transmission mechanism 25A and a free shaft end (to be referred to also as "input shaft" hereinafter) of the mower side power transmission mechanism 25B, engine power is transmitted to the blade 43. The output shaft of the vehicle body side power transmission mechanism 25A and the input shaft of the mower side power transmission mechanism 25B are connected or coupled via a power coupling mechanism 7. Preferably, this power coupling mechanism 7 is supported to the intermediate structure 6. However, the mechanism 7 can also be supported to the mower unit 4. The power coupling mechanism 7 includes a coupling body 70 having a first coupling end to be connected to the output shaft and a second coupling end to be detachably connected to the input shaft. The coupling body 70 is relatively displaced or preferably, relatively displaced linearly, between a coupling position realizing the coupling between the vehicle body side power transmission mechanism 25A and the mower side power transmission mechanism 25B and a decoupling position realizing decoupling therebetween.

A locking mechanism(s) is provided for mechanically retaining the connecting positions between the engaging portions 610 and the engaged portions 620 realizing connection between the lift link mechanism 3 and the mower unit 4 via the intermediate structure 6 and the coupling position of the coupling body 70. However, illustration of this locking mechanism is omitted in FIG. 1A and FIG. 1B. Such locking mechanism can be a spring urging mechanism or retention mechanism. Preferably, an operation of the locking mechanism is effected by an operational member or tool extending to the periphery of a driver's seat 21. Especially preferably, the connecting positions between the engaging portions 610 and the engaged portions 620 and the coupling position of the coupling body 70 are locked by a common locking mechanism. However, separate locking mechanisms can alternatively be provided for locking them individually.

The blade housing 40, in order to vary its ground level (i.e. its level or height from the ground surface), includes a front gauge wheel unit 45 at a front lateral end of the vehicle body and a rear gauge wheel unit 46 at a rear lateral end of the vehicle body. At least one gauge wheel included in a gauge unit consisting of the front gauge wheel unit 45 and the rear gauge wheel unit 46 is shiftable to a position for bringing at least a portion of the blade housing 40 into contact with the ground surface. As at least a portion of the blade housing 40 is placed in contact with the ground surface, it is possible to restrict inadvertent movement of the mower unit 4 during a connecting operation of the mower unit 4, which operation includes traveling of the mower to ride over the mower unit 4.

Figure 1B:
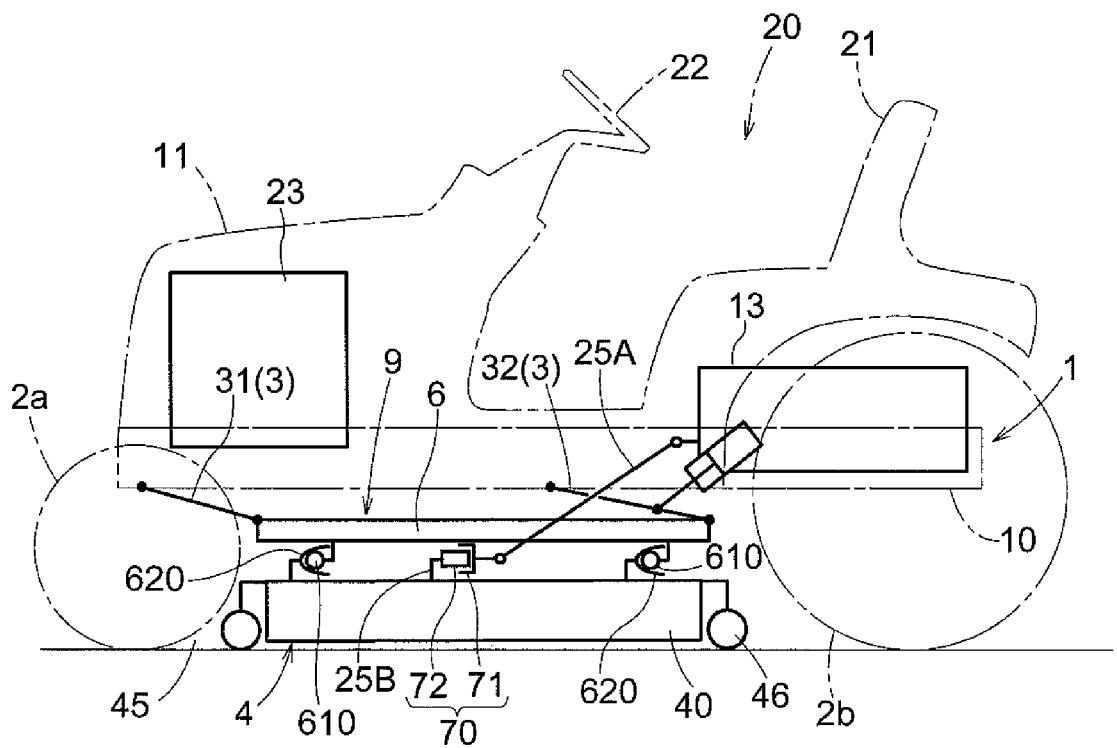
FIG. 1B is a schematic for explaining the first basic configuration of a mid-mount mower according to the present invention, showing a state in which the mower unit is connected to the vehicle body.

Incidentally, in the foregoing explanation with reference to FIG. 1A and FIG. 1B, the explanation was made that the intermediate structure 6 and the lift link mechanism 3 are provided as separate individual units. However, this explanation is applicable to an embodiment wherein the upper structure 9 comprised of the intermediate structure 6 and the lift link mechanism 3 integrated together functions as an attachment adaptor to the mower unit 4. As long as the function of the intermediate structure 6 as an attachment adaptor to the mower unit 4 and the function of the lift link mechanism 3 for lifting up/down the mower unit 4 are realized, the configurations of the intermediate structure 6 and the lift link mechanism 3 can be freely designed. The present invention is not limited to the arrangement of the intermediate structure 6 and the lift link mechanism 30 being provided as separate individual units.

Figure 2:
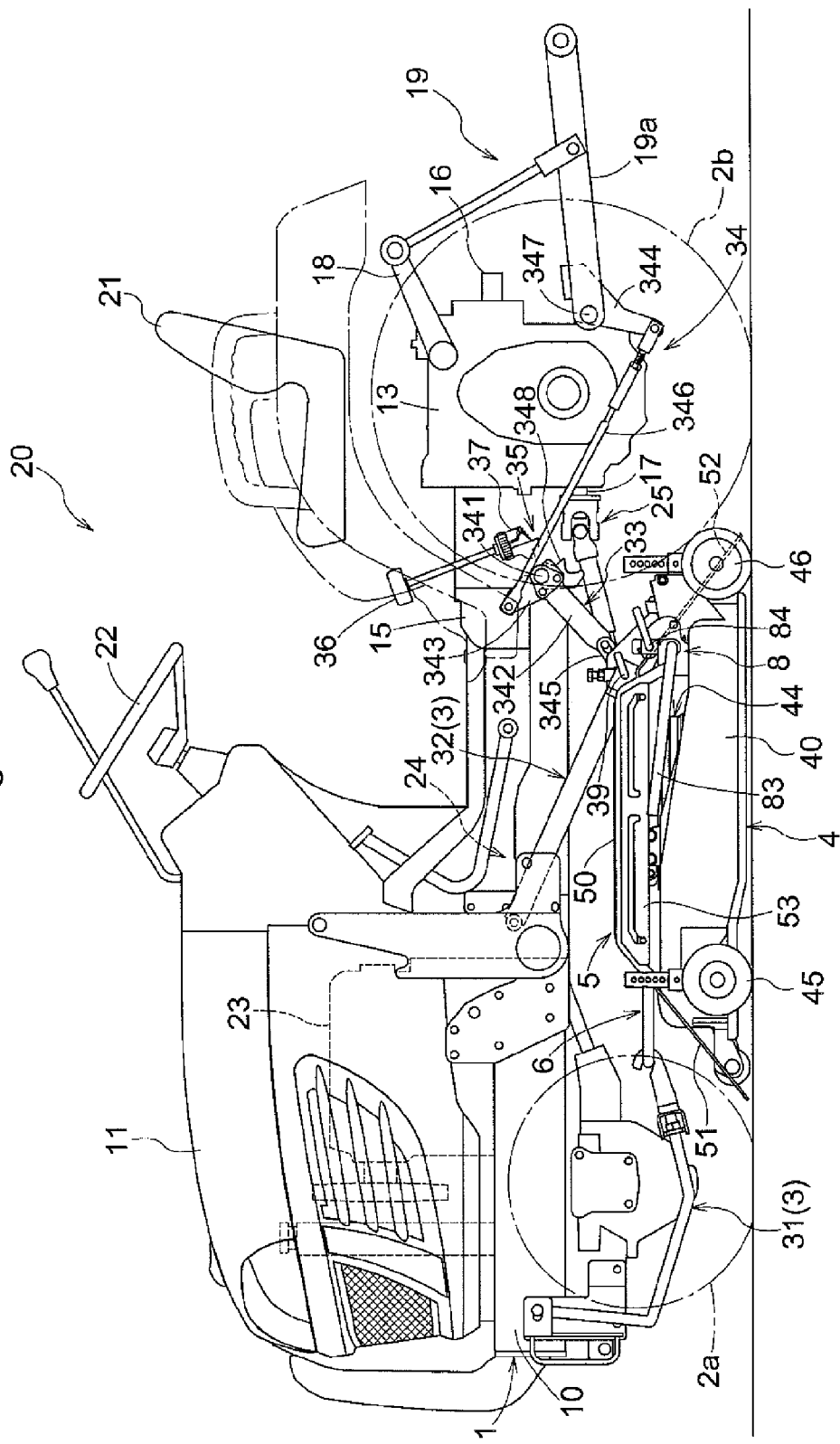
FIG. 2 is a side view showing a mid-mount mower as one of a first embodiment of the present invention.

Next, with reference to drawings, one specific arrangement as a first embodiment will be explained. FIG. 2 is a side view of a mower. This mower mounts a mower unit 4 between front wheels 2a and rear wheels 2b. However, this mower can be used also as a standard tractor, with dismounting of the mower unit 4 therefrom. The mower includes a water-cooled diesel engine (to the referred to simply as "engine" hereinafter) 23 mounted on a front half portion of a vehicle body frame 10 and covered by a hood 11, and a driver's seat 21 mounted on a rear half of the vehicle body frame 10. The front wheels 2a are configured as steerable wheels operated by a steering wheel 22 and are configured as drive wheels also. As the mower is four-wheel drive type, the rear wheels 2b too are configured as drive wheels. On the rear half portion of the vehicle body frame 10, a transmission case (to be referred to as "T/M case" hereinafter) 13 is mounted.

Power from the engine 23 is transmitted via a transmission shaft (not shown) constituting a power transmission mechanism 24 to a hydrostatic stepless speed changer (to be referred to as "HST" hereinafter) 15 connected to a front portion of the T/M case 13. And, output from the HST 15 is transmitted to a gear speed changer (not shown) mounted inside the T/M case 13. Power from the gear speed changer is divided within the T/M case 13 into a front wheel driving power and a rear wheel driving power. The front wheel driving power is transmitted to the front wheels 2a via a front wheel power transmission mechanism (constituting the power transmission mechanism 24) extending from the T/M case 13 to the front wheels 2a. The rear wheel driving power is transmitted to the rear wheels 2b via a rear wheel power transmission mechanism (also constituting the power transmission mechanism 24) extending from the T/M case 13 to the rear wheels 2b.

On the other hand, the power inputted to the HST 15 is transmitted in distribution to a first PTO (Power Take-OFF) shaft 16 mounted at the rear end of the T/M case 13 and oriented rearwards and a second PTO shaft 17 mounted to the bottom portion of the T/M case 13 and oriented forwardly. The first PTO shaft 16 and the second PTO shaft 17 together constitute a working power transmission mechanism 25 and the second PTO shaft 17 supplies power to the mower unit 4.

At the rear portion of the T/M case 13, there are provided such components as a pair of left and right lift arms 18 vertically pivoted by an operation of a lift cylinder (not shown) provided therein and a link mechanism 19 pivotally lifted up/down in operative association with the vertical pivotal movements of these lift arms 18. As the lift cylinder, a single-action type hydraulic cylinder is employed. The link mechanism 19 includes e.g. a pair of left and right lower links 19a for allowing mounting and dismounting of a work implement (not shown) such as a rotary cultivator, a plow, etc.

This mower has the basic arrangement of the present invention explained above with reference to FIG. 1A and FIG. 1B. Under the vehicle body frame 10 between the front wheels 2a and the rear wheels 2b, the mower unit 4 is mounted. Between the vehicle body frame 10 and the mower unit 4, the lift link mechanism 3 and the intermediate structure 6 are disposed. The lift link mechanism 3 supports the mower unit 4 in suspension via the intermediate structure 6 such that the mower unit 4 can be lifted up/down. The intermediate structure 6 functions as an adaptor and is connected on one hand to the lift link mechanism 3 and connected on the other hand to the mower unit 4.

The lift link mechanism 3 includes a pair of left and right front links (pivot links) 31 assuming a rearwardly lowered inclined posture and interconnecting the front portion of the vehicle body frame 10 and the front portion of the intermediate structure 6, and a pair of left and right rear links (pivot links) 32 assuming a rearwardly lowered inclined posture and interconnecting a longitudinal intermediate portion of the vehicle body frame 10 and the rear portion of the intermediate structure 6. Thus, the mechanism 3 constitutes a parallel link mechanism for lifting up/down the mower unit 4 assuming a predetermined mowing posture, via the intermediate structure 6. The left and right rear links 32 are coupled to left and right lower links 19a of a link mechanism 19 via a coupling mechanism 34.

The coupling mechanism 34 includes, e.g. a rotational shaft 341 oriented in the right/left direction and rotatably attached to the vehicle body frame 10, a pair of left and right first coupling arms 342 extending to the forward side of the vehicle body from the rotational shaft 341 and mounted to this rotational shaft 341 integrally therewith, a pair of left and right second coupling arms 343 extending upwardly of the vehicle body from the rotational shaft 341 and mounted to this rotational shaft 341 integrally therewith, a pair of left and right coupling arms 344 provided at the rear portion of the T/M case 13, a pair of left and right coupling rods 345 for coupling the left and right first coupling arms 342 to free ends of the rear links 32 corresponding thereto, a pair of left and right coupling rods 346 for coupling the left and right second coupling arms 343 to the coupling arms 344 corresponding thereto, etc. The left and right coupling arms 344 are pivotally mounted on support shafts 347 of the lower links 19a corresponding thereto. At upper portions of the left and right coupling arms 344, as stoppers for restricting pivotal movement of the coupling arms 344 due to e.g. a load applied to the left and right rear links 32, contact pieces are formed as bent portions configured to contact one side of upper edges of the lower links 19a of the link mechanism 19 from above.

That is, the mower unit 4 is connected to the vehicle body frame 10 via the lift link mechanism 3 and the intermediate structure 6. Further, the lift link mechanism 3 is coupled to the link mechanism 19 via the coupling mechanism 34. These arrangements enable lifting up/down of the mower unit 4 at the lower body portion of the tractor.

Though not shown in details in FIG. 2, the rotational shaft 341 integrally mounts a single third coupling arm 348 which extends toward the rear side of the vehicle body. The vehicle body frame 10 includes a lower limit setting mechanism 35 which receives the third coupling arm 348 pivoted upwards in association with a lower pivotal movement of the left and right rear links 32, thereby to prevent a downward pivotal movement of the left and right rear links 32. The lower limit setting mechanism 35 includes such components as an operational member 36 which can be operated pivotally about a vertical axis from the riding driving section, a tubular receiving portion 37 pivotable about the vertical axis together with the operational member 36, etc. And, the lower edge of the receiving portion 37 receiving the third coupling arm 348 is formed like steps having different heights in the circumferential direction.

With the above-described arrangement in operation, by pivotally operating the operational member 36 about the vertical axis from the riding driving section, it is possible to vary a receiving height position of the receiving portion 37 to receive the third coupling arm 348 to a desired height position, whereby the lower limit position of the left and right rear links 22 relative to the vehicle body frame 10 (to be referred to as the lower limit position of the rear links 32) can be variably set easily.

That is, the lower limit position of the left and right rear links 32 can be variably set by this lower limit setting mechanism 35. As a result, the lowering limit height of the mover unit 4 relative to the vehicle body frame 10 is changed.

Figure 3:
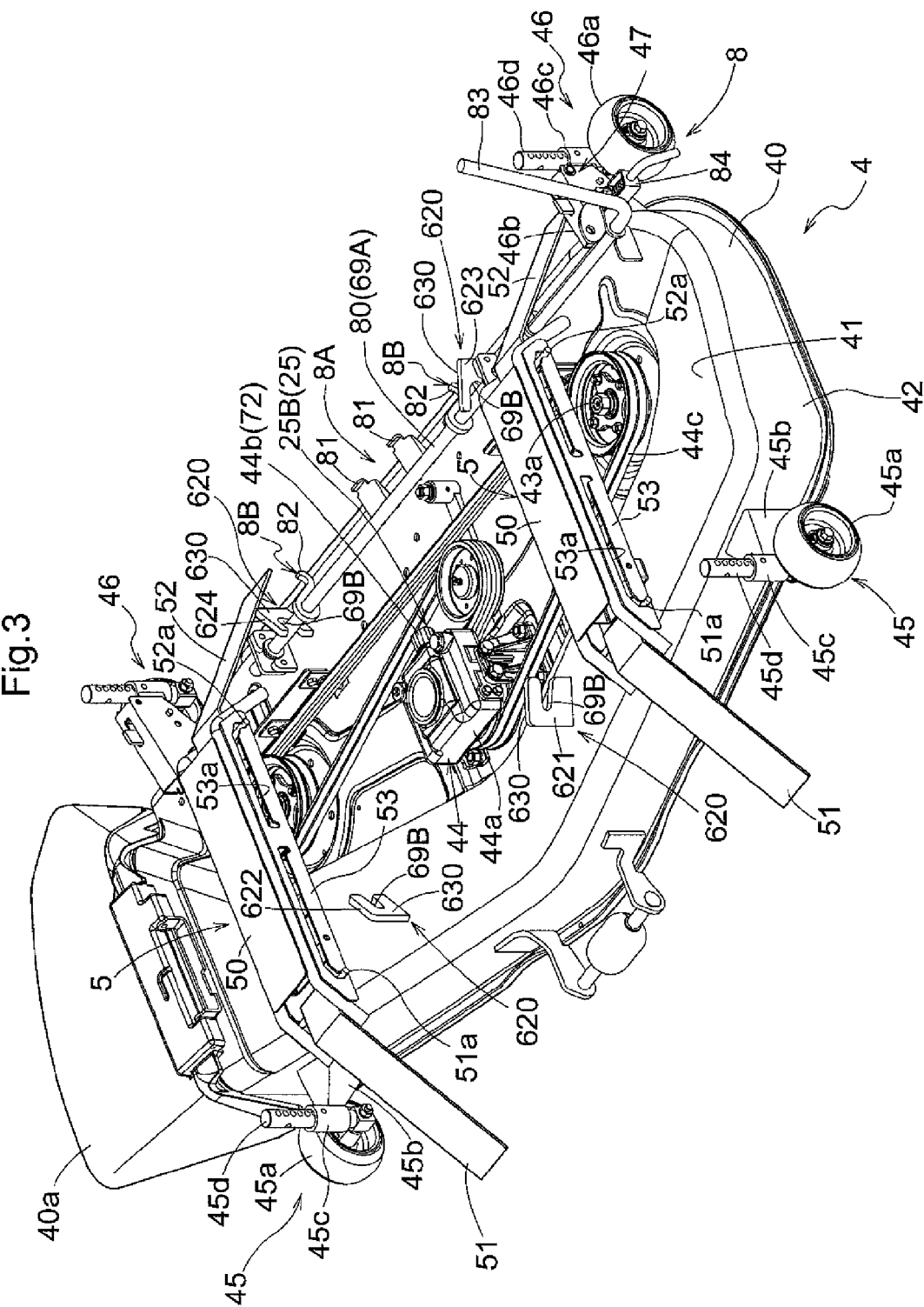
FIG. 3 is a perspective view showing a mower unit.
Figure 4:
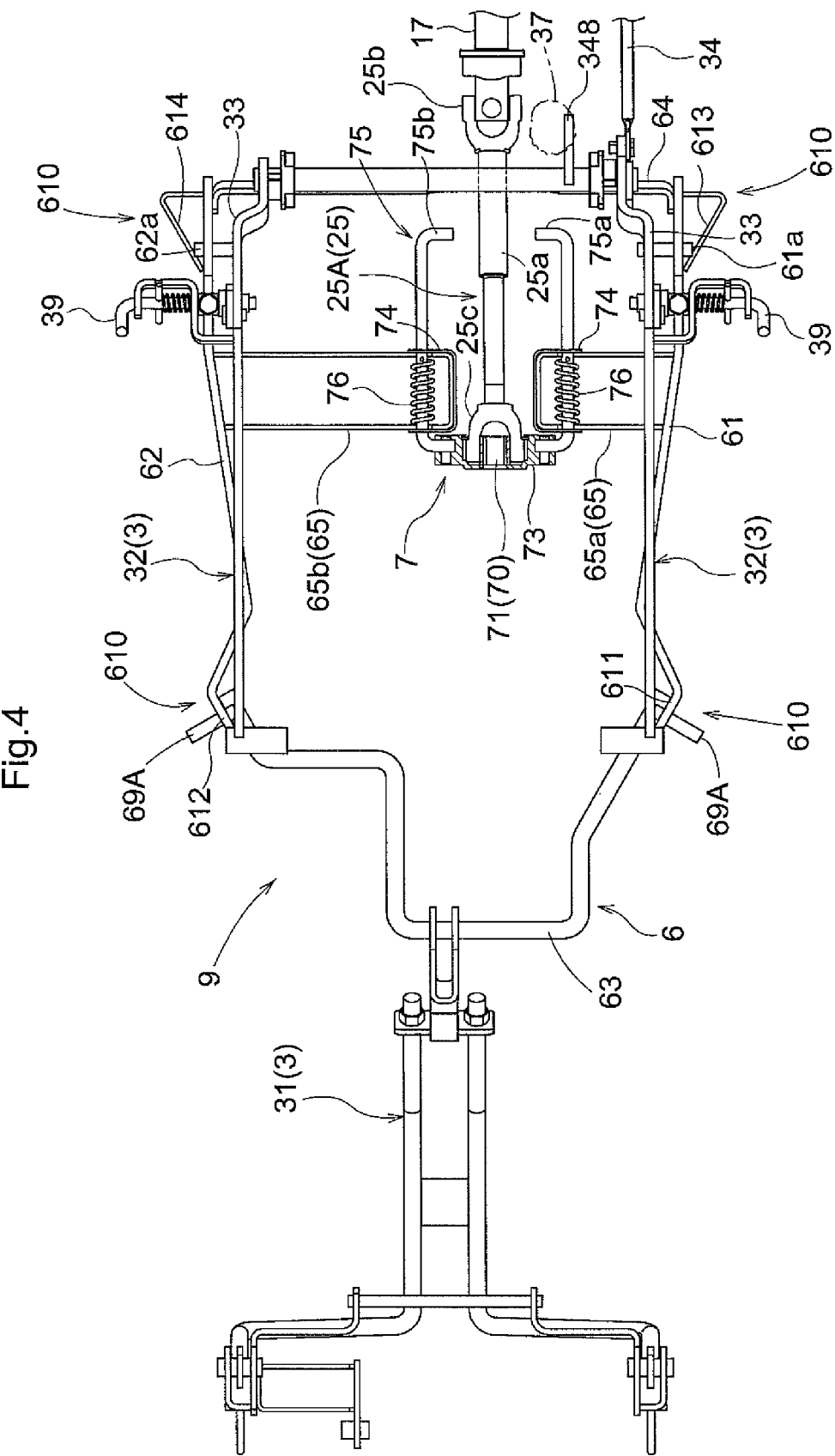
FIG. 4 is a plan view showing a lift link mechanism and an intermediate structure.
Figure 5:
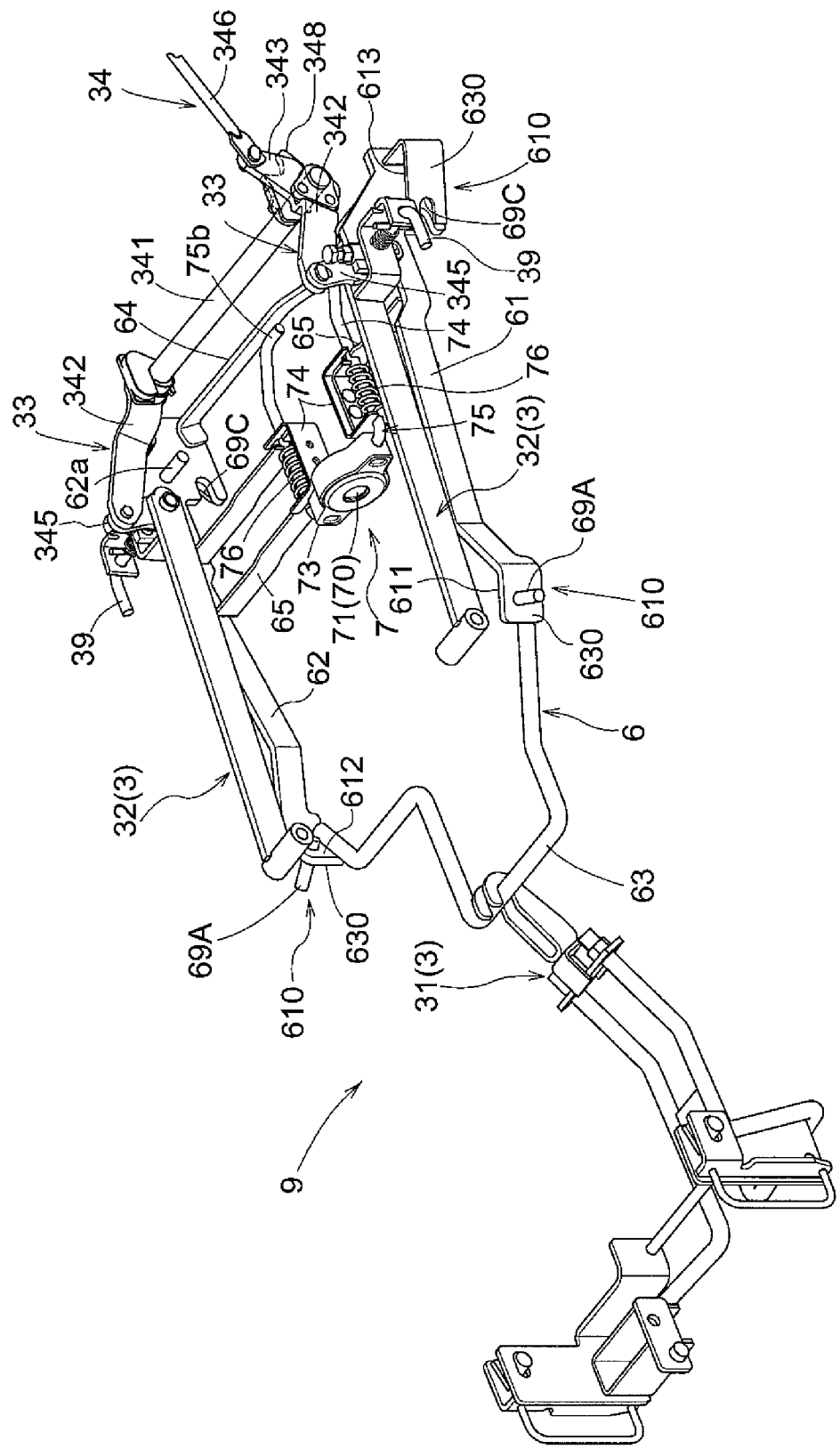
FIG. 5 is a perspective view showing the lift link mechanism and the intermediate structure.
Figure 6:
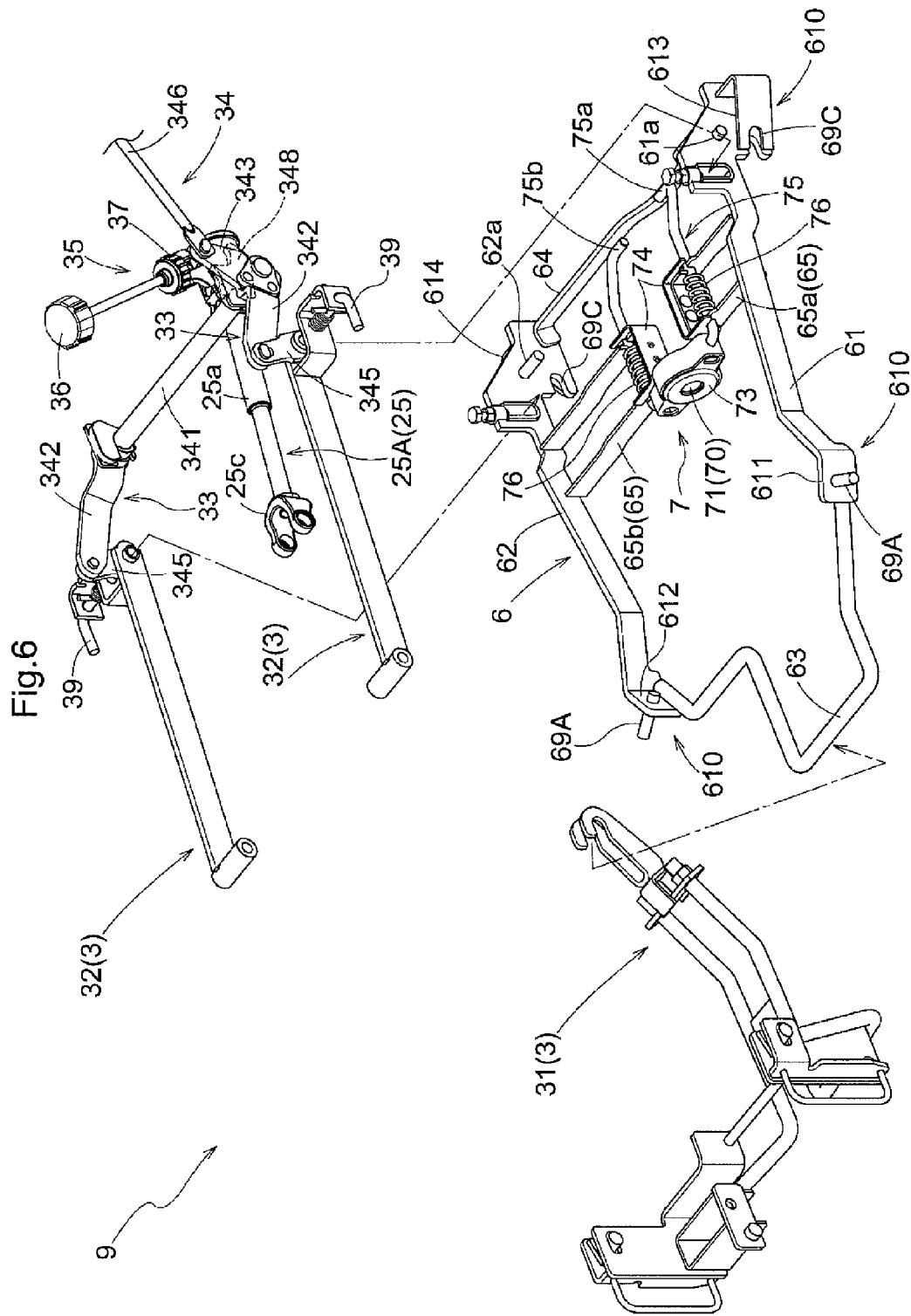
FIG. 6 is an exploded perspective view showing the lift link mechanism and the intermediate structure separately from each other.

In FIG. 2, the lift link mechanism 3, the intermediate structure 6 and the mower unit 4 are shown. In this illustration, the intermediate structure 6 and the mower unit 4 are connected to each other. In FIG. 3, only the mower unit 4 is shown. FIG. 4, FIG. 5 and FIG. 6 show the intermediate structure 6 connected to the lift link mechanism 3. FIG. 6 shows a state wherein the front links 31, the rear links 32 and the intermediate structure 6 are separated from each other. As may be apparent from the FIG. 3 illustration, the mower unit 4 includes a vertically oriented rotational shaft 43a for rotating three blades clockwise which are juxtaposed along the vehicle body traverse direction in a plan view, though not seen in FIG. 3 illustration, and the blade housing 40 covering these blades from above. The blade housing 40 includes a top plate 41 and a side plate 42 extending downwards from the circumferential edge of the top plate 41. The top plate 41 of the blade housing 40 mounts a blade driving power distribution mechanism 44. Also, a transmission cover for covering from above a belt transmission mechanism 44c of the power distribution mechanism 44 is detachably mounted, but its illustration is omitted in FIG. 3. The blade housing 40, at its front end region, forms an upwardly extending bulging portion extending along the right/left direction, thereby to create a transport passage for mowed grass therein. A discharge cover 40a is attached to the right end of the blade housing 40 forming a discharge outlet of this transport passage.

That is, this mower unit 4 is configured as a side-discharge type in which grass clippings cut by the three blades are transported through the transport passage formed inside the blade housing 40 by transporting air current generated in association with rotation of each blade and discharged through the discharge outlet at the right end of the unit 4 to the outside.

Figure 7A:
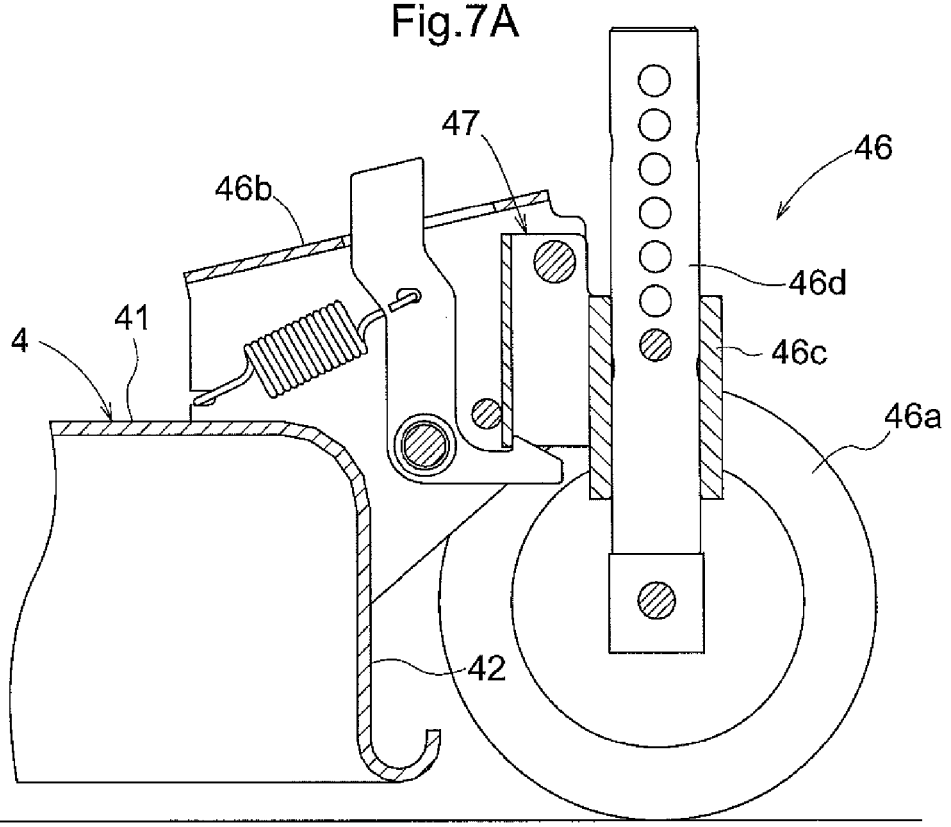
FIG. 7A is a section showing a flip-up mechanism for a gauge wheel, showing a state in which a rear gauge wheel is placed in contact with a ground surface.
Figure 7B:
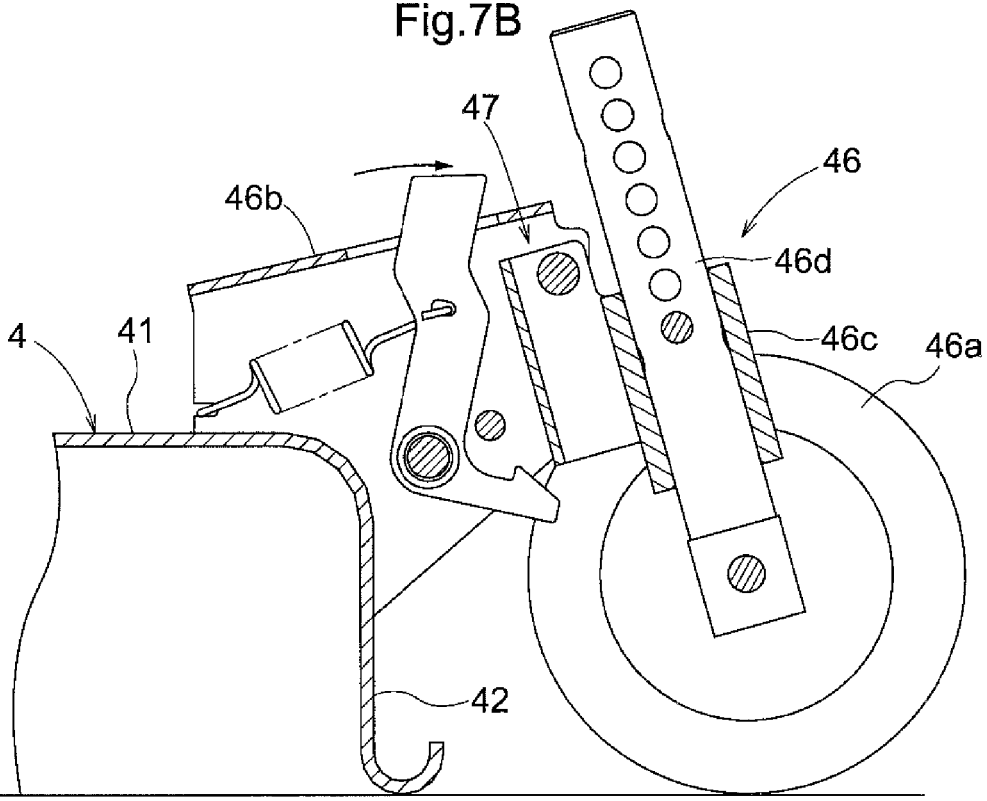
FIG. 7B is a section showing a flip-up mechanism for a gauge wheel, showing a state in which the rear gauge wheel is flipped up.

As shown in FIG. 3, at the left and right opposed ends of the front portion and the rear portion of the blade housing 40, there are provided front gauge wheel units 45 each being height-adjustable and rear gauge wheel units 46 also each being height-adjustable. Incidentally, in FIG. 7, the rear gauge wheel unit 46 alone is shown in enlargement. Each front gauge wheel unit 45 includes a support bracket 45b having a vertical boss portion 45c and a front gauge wheel 45a mounted on an axle fixed to a sliding support shaft 45d slidably inserted into the vertical boss portion 45c. The sliding support shaft 45d is fixed at a selected position by pin-fixing. The rear gauge wheel unit 46, as shown in FIG. 7 in details, includes a support bracket 46b having a vertical boss portion 46c flipped up by a flip-up mechanism 47, and a rear gauge wheel 46a mounted on an axle fixed to a sliding support shaft 46d slidably inserted into the vertical boss portion 46c. The sliding support shaft 46d too is fixed at a selected position by pin-fixing. The flip-up mechanism 47, in this embodiment, is configured to retain a vertical posture of the sliding support shaft 45d by retaining, by a spring-urged pivot arm, the vertical boss portion 46c supported to the support bracket 46b to be pivotable about a horizontal axis (see FIG. 7A) and also to render the sliding support shaft 45d to an inclined posture by releasing the retention of the pivot arm (see FIG. 7B). Namely, this flip-up mechanism 47 has a function of flipping up the rear gauge wheel 46a, by releasing the spring urging. When the rear gauge wheel 46a is flipped up, the lower end of the side plate 42 of the blade housing 40 comes into contact with the ground surface. With this, a large frictional force is applied between the blade housing 40 and the ground surface, so that even in the event of application of an external force thereto, movement of the blade housing 40 is restricted.

Figure 8:
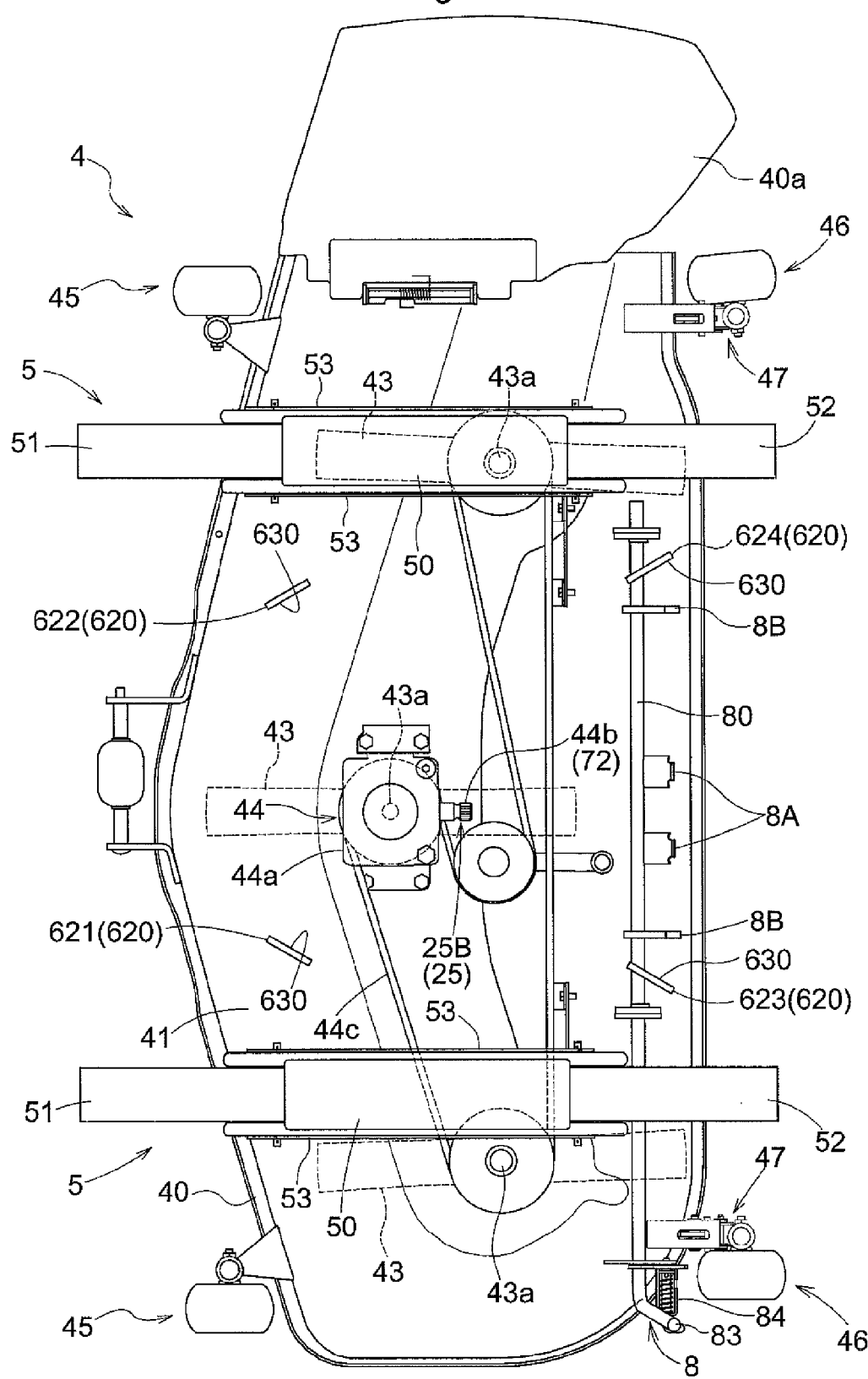
FIG. 8 is a plan view showing the mower unit.

As shown clearly in FIG. 8, the power distribution mechanism 44 includes an input shaft (a constituent of the mower side power transmission mechanism 25B) extending rearwards from a housing 44a disposed at the center of the blade housing 40, and the belt transmission mechanism 44c for transmitting the power received by the input shaft 44b in distribution to three rotational shafts 43a to which the blades 43 are fixed respectively.

Next, with reference to FIG. 4, FIG. 5, FIG. 6 and FIG. 9 and FIG. 10, an embodiment of the intermediate structure 6 will be explained. This intermediate structure 6 has a framework consisting of a first member 61 and a second member 62 which extend in the vehicle body front/rear direction with forming a space therebetween, a front connecting member 63 interconnecting front portions of the first member 61 and the second member 62, and a rear connecting member 64 interconnecting rear portions of the first member 61 and the second member 62. The front connecting member 63 is a bar-like member having a convex portion at the center thereof, and at this convex portion, a hook-like free end of the front link 31 of the lift link mechanism 3 is pivotally retained. To the rear portions of the first member 61 and the second member 62, the free end of the rear links 32 of the lift link mechanism 3 are pivotally pin-connected via link pins 39.

To interconnect the intermediate structure member 6 and the blade housing 40, the intermediate structure 6 includes engaging portions 610, whereas the top plate 41 of the blade housing 40 includes engaged portions 620 engageable with the engaging portions 610. In the instant embodiment, each engaging portion 610 includes a vehicle body side first front guide 611 provided as a bent portion formed in the region of the first member 61 connected to the connecting member 63, a vehicle body side second front guide 612 provided as a bent portion formed in the region of the second member 62 connected to the connecting member 63, a vehicle body side first rear guide 613 provided as an outwardly projecting bracket-like member disposed at the rear end of the first member 61, and a vehicle body side second rear guide 614 provided as an outwardly projecting bracket-like member disposed at the rear end of the first member 61.

Each engaged portion 620 includes a mower side first guide 621 and a mower side second front guide 622 which are disposed erect at the front region of the top plate 41 in distribution on the left and right sides, and a mower side first rear guide 623 and a mower side second rear guide 624 which are disposed erect at the rear region of the top plate 41 in distribution on the left and right sides. The mower side first front guide 621 and the vehicle body side first front guide 611, the mower side second front guide 622 and the vehicle body side second front guide 612, the mower side first rear guide 623 and the vehicle body side first rear guide 613, the mower side second rear guide 624 and the vehicle body side second rear guide 614, are disposed respectively at mutually engaging positions, under the interconnected state of the intermediate structure 6 and the blade housing 40.

In this embodiment, the vehicle body side first front guide 611 and the vehicle body side second front guide 612 respectively include an engaging pin 69A extending horizontally in an obliquely forward direction. Whereas, the vehicle body side first rear guide 613 and the vehicle body side second rear guide 614 respectively include an elongate slot 69C extending horizontally in an oblique direction and opened to the front side. Further, the mower side first front guide 621 and the mower side second front guide 622 respectively include an elongate slot 69B extending horizontally in an oblique direction and opened to the rear side.

Further, in a rear region of the top plate 41, a rotational operation shaft 80 for a locking mechanism 8 to be described in details later extends in the vehicle body transverse direction (transverse direction). This rotational operation shaft 80 functions as an engaging pin engageable with the elongate slots 69C of the vehicle body side first rear guide 613 and the vehicle body side second rear guide 614.

The vehicle body side first front guide 611, the vehicle body side second front guide 612, the vehicle body side first rear guide 613, the vehicle body side second rear guide 614, and the mower side first front guide 621, the mower side second front guide 622, the mower side first rear guide 623, the mower side second rear guide 624, respectively include an inclined face which extends closer to a vehicle body longitudinal centerline as it extends forwardly. And, the respective corresponding inclined faces are formed so as to come into contact with each other substantially, under the interconnected state of the intermediate structure 6 and the blade housing 40. Namely, these inclined faces function as "guide faces" for guiding the intermediate structure 6 to the position for connection with the mower housing 40 as the mower travels forwardly relative to the blade housing 40 placed on the ground surface. That is, the engaging portions 610 of the intermediate structure 6 and the engaged portions 620 of the blade housing 40 respectively include a guide face as an inclined face, and these guide faces come into contact with each other in association with a movement in the vehicle body front/rear direction.

The second PTO shaft 17 transmits power to the input shaft 44b (see FIG. 6) of the power distribution mechanism 44 of the mower unit 4, and the working power transmission mechanism 25 disposed therebetween is divided into the vehicle body side power transmission mechanism 25A and the mower side power transmission mechanism 25B. These mechanisms can be connected to or disconnected from each other by the power coupling mechanism 7 provided in the intermediate structure 6. In the instant embodiment, the mower side power transmission mechanism 25B includes a first universal joint 25b and the input shaft 44b. The vehicle body side power transmission mechanism 25A includes a relay shaft 25a, the first universal joint 25b and a second universal joint 25c. The first universal joint 25b interconnects the second PTO shaft 17 and the relay shaft 25a. The second universal joint 25c interconnects the relay shaft 25a functioning as an output shaft of the vehicle body side power transmission mechanism 25A and the input shaft 44b functioning as an input shaft of the mower side power transmission mechanism 25B. This second universal joint 25c includes a spline-type connecting portion enabling connection to and disconnection from the input shaft 44b. The mechanism for effecting these connection and disconnection is the power coupling mechanism 7. The disconnecting state of the power coupling mechanism 7 is shown in FIG. 9 and its connecting state is shown in FIG. 10.

Figure 9:
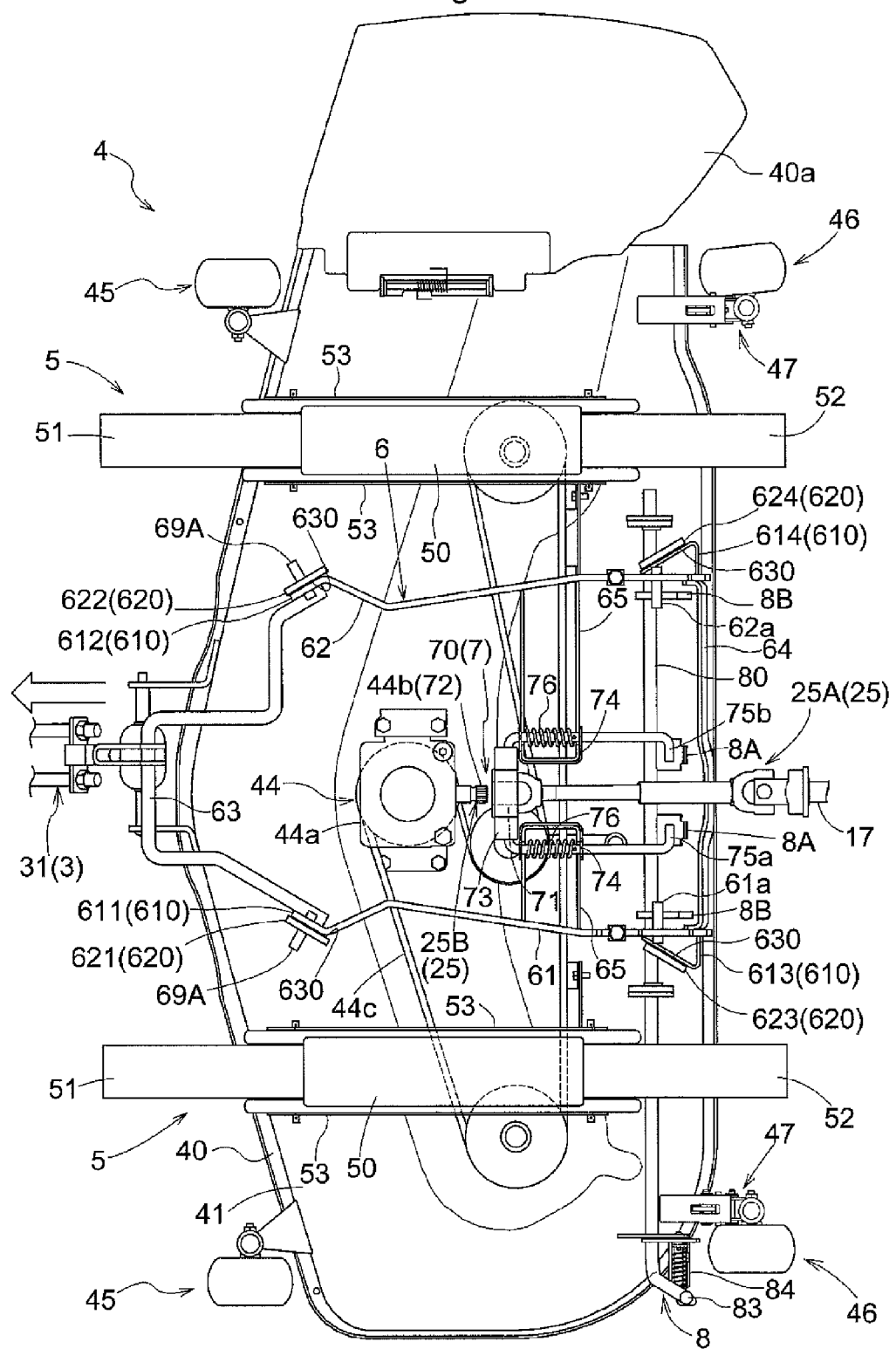
FIG. 9 is a plan view showing the mower unit and the intermediate structure before coupling of a power coupling mechanism.
Figure 10:
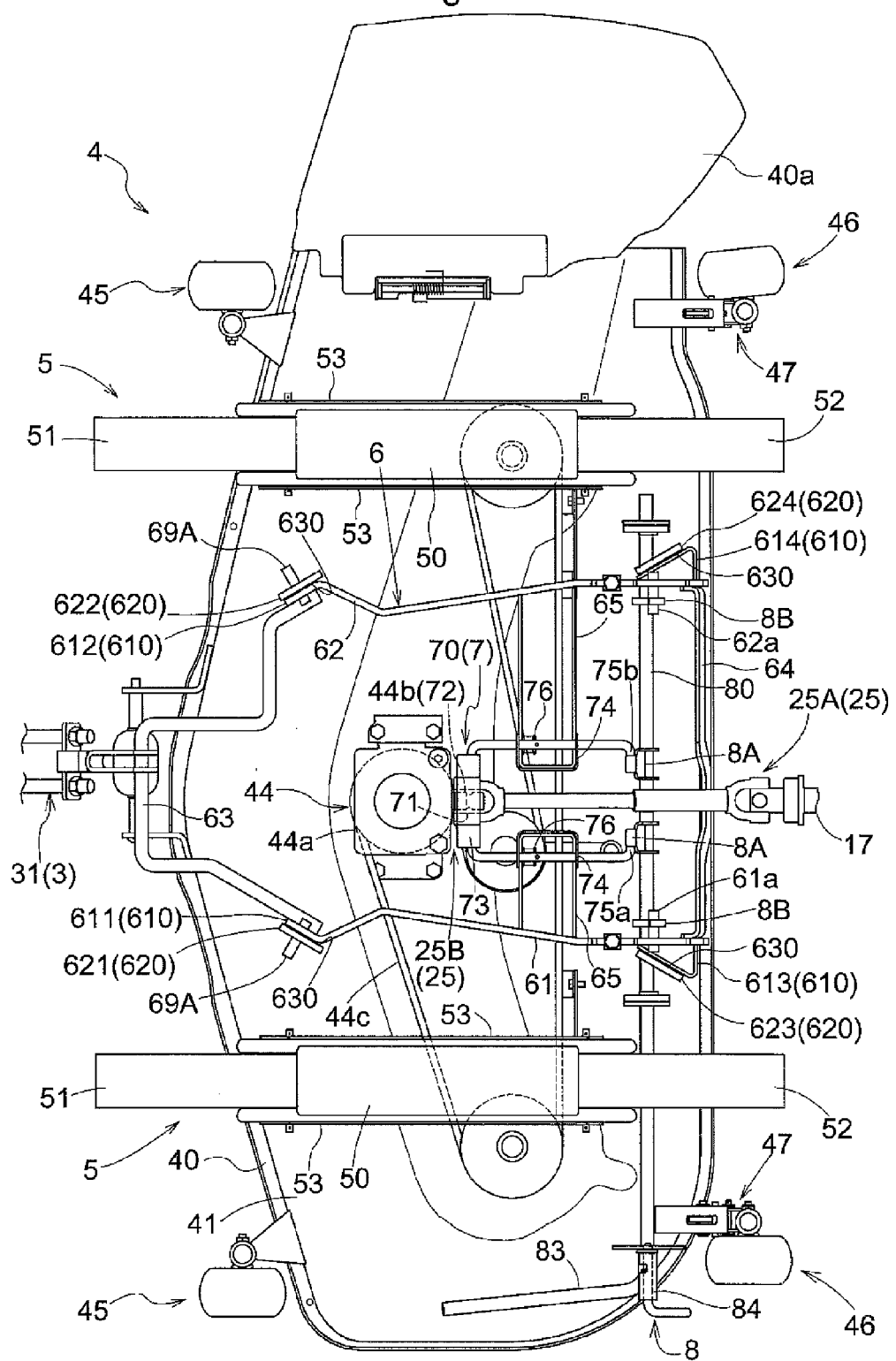
FIG. 10 is a plan view showing the mower unit and the intermediate structure after the coupling of the power coupling mechanism.

As may be understood from FIG. 9 and FIG. 10, the power coupling mechanism 7 includes a coupling body 70 which is provided as the second universal joint 25c in this embodiment, a coupling holding portion 73 configured to hold the coupling body 70 by surrounding it and holding it via an inner circumferential face thereof, and an attaching unit 75 for attaching the coupling holding portion 73 to the intermediate structure with allowing displacement of the coupling holding portion 73 in the vehicle body front/rear direction. The coupling body 70 includes a first connecting end 71 to be connected to the relay shaft 25a and a second connecting end 72 to be connected to the input shaft 44b. The second connecting end 72 has an inner circumferential face formed with a spline engageable with the spline formed on the input shaft 44b. The coupling holing portion 73 is a boss member having projections at opposed ends thereof. And, the coupling body 70 is fixed within a boss hole of this boss member. As the coupling holding portion 73 is moved toward the input shaft 44b of the power distribution mechanism 44, the input shaft 44b and the second connecting end 72 are spline-engaged with each other. The attaching unit 75 is provided for realizing such movement of the coupling holding portion 73. To this end, the attaching unit 75 is configured as a slider mechanism for moving the coupling holding portion 73. As a force (e.g. an operational force by a driver) is applied from the outside to this slider mechanism, the coupling holding portion 73 is moved, thus realizing the connection of the power coupling mechanism 7. In this embodiment, in order to cause a translation movement of the coupling holding portion 73, there are provided a first leg portion 75a and a second leg portion 75b as a pair of slider rods, and guide holes as slide guides for the respective slider rods. The first leg portion 75a is a bar-like member fixed to the left end of the coupling holding portion 73 and extending rearwards therefrom. The second leg portion 75b is a bar-like member fixed to the right end of the coupling holding portion 73 and extending rearwards therefrom. The guide holes are through holes formed in a first bracket 65a and a second bracket 65b provided in the first member 61 and the second member 62, respectively, as will be described later herein. The first leg portion 75a and the second leg portion 75b are inserted into these through holes, thus being slidably supported to the first bracket 65a and the second bracket 65b. Meanwhile, in the instant embodiment, the attaching unit 75 is supported to the first member 61 and the second member 62, that is, to the intermediate structure 6. However, instead of this, the attaching unit 75 can be supported to the vehicle body 1, e.g. to the vehicle body frame 10.

The intermediate structure 6 includes the first bracket 65a having a U-shape in its plan view and having its end connected to the first member 61 and extending toward the second member 62, and the second bracket 65b having a U-shape in its plan view and having its end connected to the second member 62 and extending toward the first member 61. Between the leading end of the first bracket 65a and the leading end of the second bracket 65b, there is formed a gap through which the relay shaft 25a can pass. Further, the first bracket 65a defines, in its leading end region, a hole in which the first leg portion 75a is inserted and the second bracket 65b defines, in its leading end region, a hole in which the second leg portion 75b is inserted. With these, the first leg portion 75a and the second leg portion 75b are supported to the attaching unit 75 to be movable in the vehicle body front/rear direction. When the coupling holding portion 73 is moved together with the attaching unit 75 to a predetermined connecting position toward the input shaft 44b of the power distribution mechanism 44 under the interconnected state of the intermediate structure 6 and the blade housing 40, spline connection is established between the second connecting end 72 of the coupling body (the second universal joint 25c) and the input shaft 44b.

Incidentally, as shown in FIG. 9 and FIG. 10, between the first leg portion 75a of the power distribution mechanism 44 and the first bracket 65a and also between the second leg portion 75b of the mechanism 44 and the second bracket 65b, springs 76 are disposed for providing an urging force to release connection between the coupling body 70 held to the coupling holding portion 73 and the input shaft 44b of the power distribution mechanism 44. Accordingly, when the locking mechanism 8 is pivoted in the direction for releasing lock, the coupling body 70 is automatically withdrawn from the input shaft 44b. In FIG. 9, there is shown an expanded state of the spring 76, that is, a state prior to establishment of spline-engagement between the input shaft 44b and the second connecting portion 72. In FIG. 10, there is shown a compressed state of the spring 76, that is, a state after establishment of the spline-engagement between the input shaft 44b and the second connecting portion 72.

Next, with reference to FIGS. 8 through 16, the locking mechanism 8 provided in the blade housing 40 in this embodiment will be explained in details. As shown in the plan view of FIG. 8, the locking mechanism 8 includes a second locking mechanism 8A for locking the coupling holding portion 73 at the connecting position and a first locking mechanism 8B for locking the engaging portions 610 and the engaged portions 620 at the mutually engaged positions. The second locking mechanism 8A and the first locking mechanism 8B include a common rotational operation shaft 80. And, this rotational operation shaft 80 extends in the vehicle body traverse direction in the rear end region of the top plate 41 of the blade housing 40 and is rotatably supported by a plurality of bearing stands. The rotational operation shaft 80 includes two first acting portions 81 for the second locking mechanism 8A and two second acting portions 82 for the first locking mechanism 8B. The first acting portions 81 are provided as arms configured to come into contact with the contacting portions provided at the rear ends of the first leg portion 75a and the second leg portion 75b of the power coupling mechanism 7 in association with rotation of the rotational operation shaft 80 to press the coupling holding portion 73 to the connecting position and holding this connecting position. The second acting portions 82 are provided as hook-like arms configured to come into contact with a pin-like projection 61a provided in the first member 61 and a pin-like projection 62a provided in the second member 62 and to hold these projections therein, thus retaining the engaging portions 610 and the engaged portions 620 at the engaging positions thereof, whereby the interconnection between the intermediate structure 6 and the blade housing 40 is retained. At one end of the rotational operation shaft 80, there is fixed a rod-like operational arm 83 extending to the periphery of the driver's seat 21. By an operation of the operational arm 83 by a driver seated at the driver's seat 21, locking and lock-releasing of the locking mechanism 8 are possible.

Figure 11:
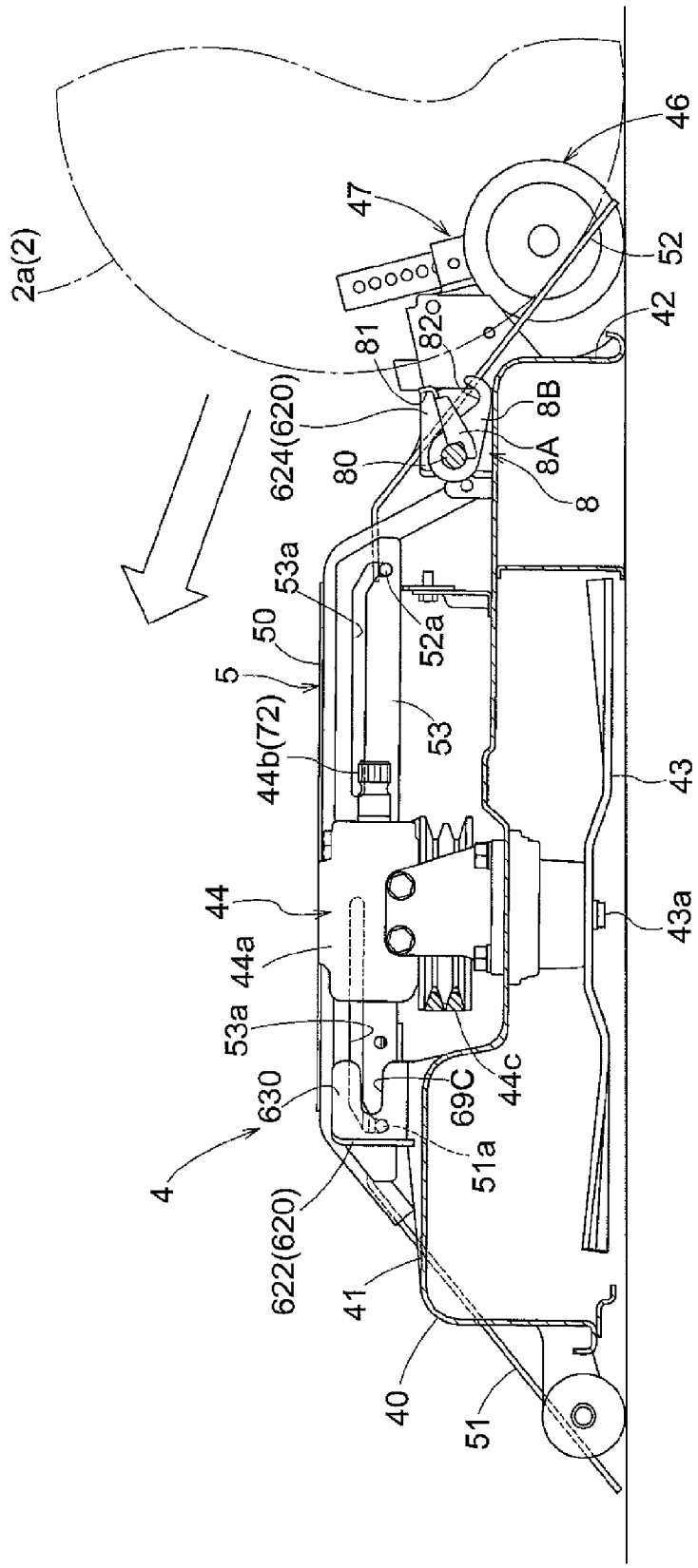
FIG. 11 is a vertical section showing a right-side functional portion of a first locking mechanism.
Figure 12:
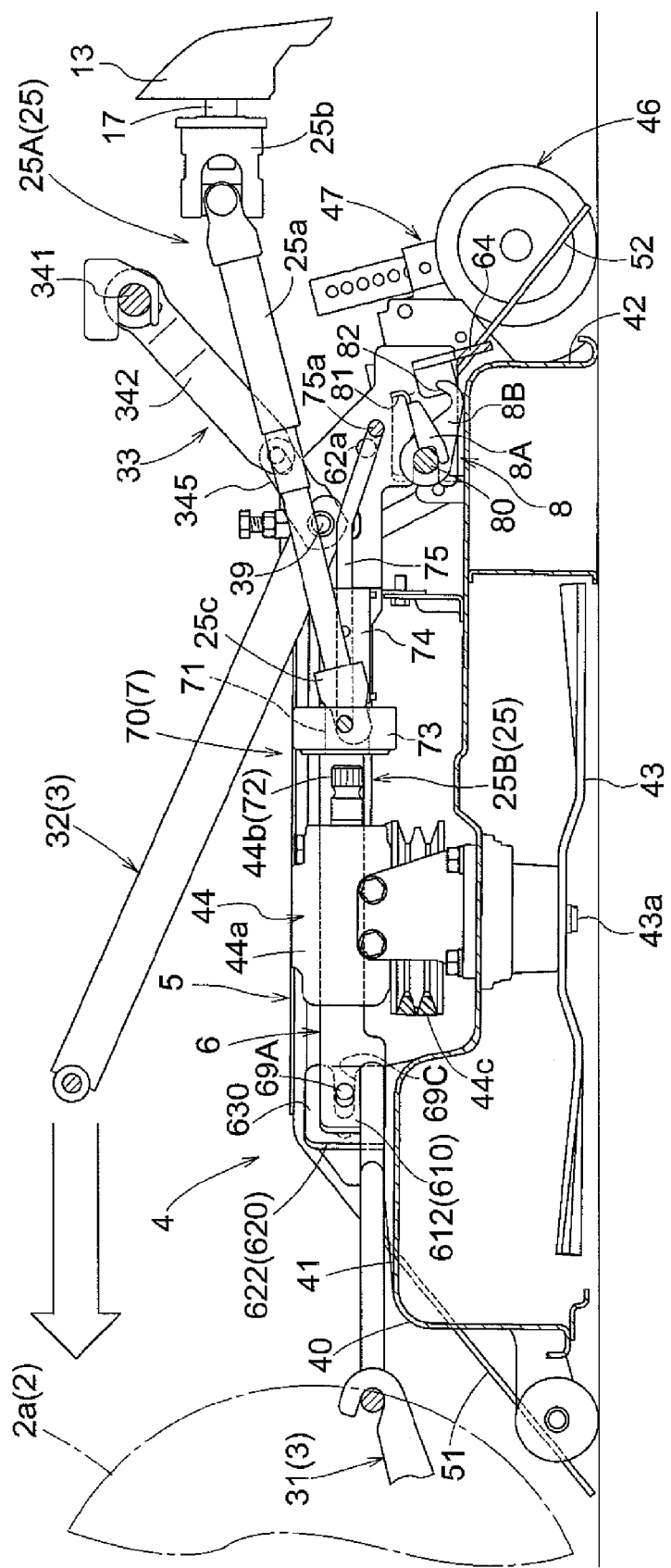
FIG. 12 is a side view showing the first locking mechanism before coupling and showing also a blade housing in its section.

With the mower according to the present invention, when the mower unit 4 is to be mounted to the vehicle body 1, the mower is caused to travel forwardly to ride over the mower unit 4 placed laterally on the ground surface. To this end, the blade housing 40 includes a ride-over mechanism 5. This ride-over mechanism 5, as shown in FIG. 3 and FIG. 11, is provided for each one of the left and right front wheels 2a. And, the distance between the mechanisms 5 corresponds to the front-wheel tread width. Each ride-over mechanism 5 includes a bridge portion 50 extending along the front/rear direction upwardly of the belt transmission mechanism 44c mounted to the top plate 41 of the blade housing 40, a front auxiliary plate 51 extending with an inclination from the front end of the bridge portion 50 toward the ground surface, and a rear auxiliary plate 52 extending with an inclination from the rear end of the bridge portion 50 toward the ground surface. The bridge portion 50 consists of a pair of arch-shaped rods having a flat intermediate portion, and a stepping plate disposed on the top faces of the intermediate portions of the pair of rods. Further, to opposed sides of the bridge portion 50, side plates 53 are attached. The front auxiliary plate 51 and the rear auxiliary plate 52 are configured as slide type, so that these plates are retracted within the bridge portion 50 when out of use. This slide-type storage is realized by a guide pin 51a provided at the rear end of the front auxiliary plate 51 and a guide pin 52a and guide slits 53a provided at the front end of the rear auxiliary plate 52. The guide slits 53a are formed in the respective side plates 53 substantially horizontally in the front/rear direction so as to respectively guide the guide pin 51a and the guide pin 52a inserted therein during the movement. But, these guide slits 53a are formed vertical at terminal ends thereof so as to retain the inclined postures of the front auxiliary plate 51 and the rear auxiliary plate 52 in a reliable manner, when the pins are withdrawn therefrom.

Firstly, for mounting the mower unit 4 to the lower body portion of the tractor, the intermediate structure 6 is lowered in advance to its lower limit position by an operation of the lift link mechanism 3. In succession, the vehicle body 1 is caused to travel forwardly so that the front wheels 2a move above the blade housing 40 to ride over this housing with utilizing the ride-over mechanism 5 from the rear side of the mower unit 4. When the front wheels 2a have passed over the blade housing 40, the engaging portions 610 (the four guides 611-614 provided on the front, rear, left and right sides) provided in the intermediate structure 6 come into engagement with the engaged portions 620 (the four guides 621-624 provided on the front, rear, left and right sides) provided in the blade housing 40. More particularly, the engaging pins 69A provided in the vehicle body side first front guide 611 and the vehicle body side second front guide 612 are guided by the respective guide faces 630 and enter the elongate slots 69B provided in the mower side first rear guide 613 and the mower side second rear guide 614. In the course of this, the vehicle body side first rear guide 613 and the vehicle body side second rear guide 614 come into face contact with the mower side first rear guide 623 and the mower side second rear guide 624, respectively and move into the regions restricted by these mower side first rear guide 623 and mower side second rear guide 624. At the same time, into the slots 69 provided in the vehicle body side first rear guide 613 and the vehicle body side second rear guide 614, the rotational operation shaft 80 of the lock mechanism 8 as an engaging pin enters. After the front wheels 2a have ridden past over the blade housing 40, the vehicle body 1 is stopped.

At this point, on the axis of the input shaft 44b extending rearwards in the vehicle body front/rear direction of the power distribution mechanism 44 of the mower unit 4, the axis of the coupling body 70 of the power coupling mechanism 7 provided in the intermediate structure 6 is positioned. Thus, the input shaft 44b and the coupling body 40 are aligned on the same axis in the vehicle body front/rear direction.

Figure 13:
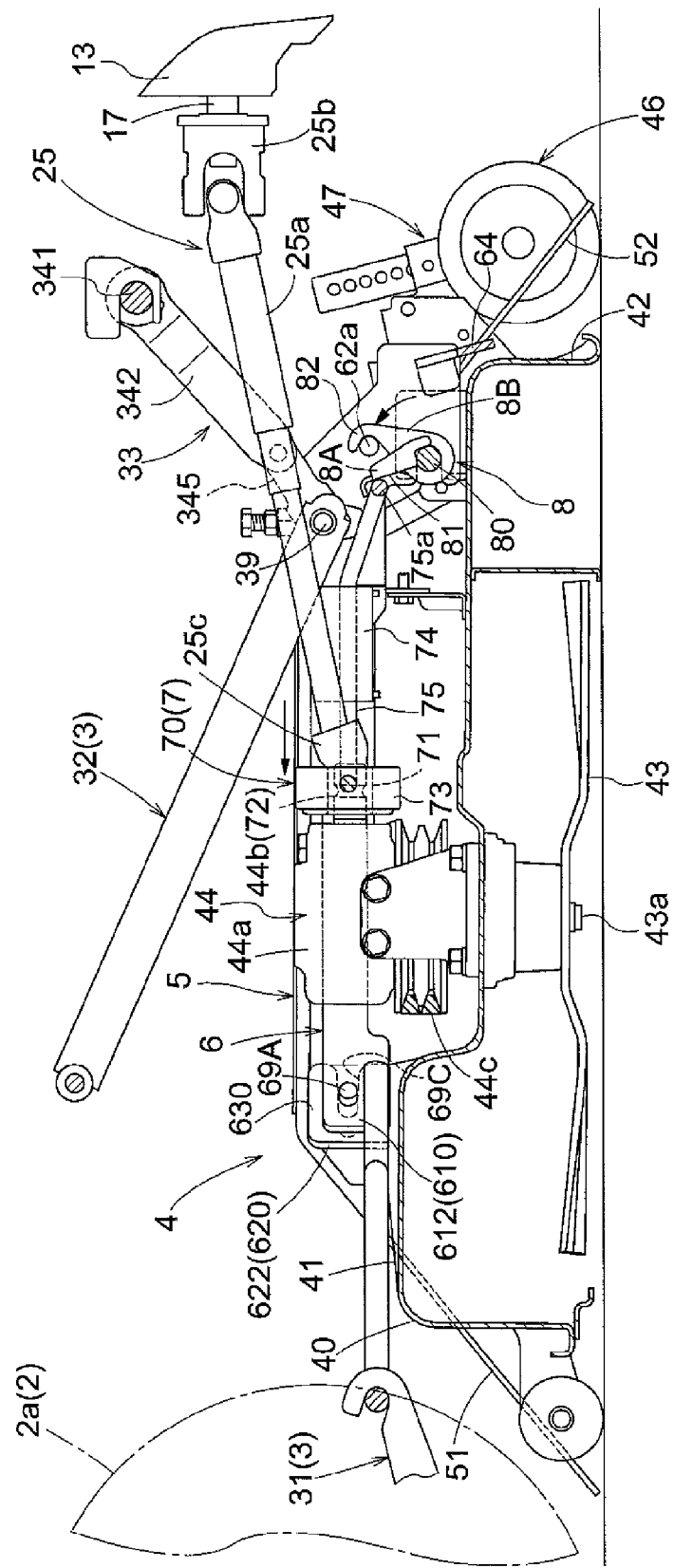
FIG. 13 is a side view showing the first locking mechanism after the coupling and showing also the blade housing in its section.
Figure 14:
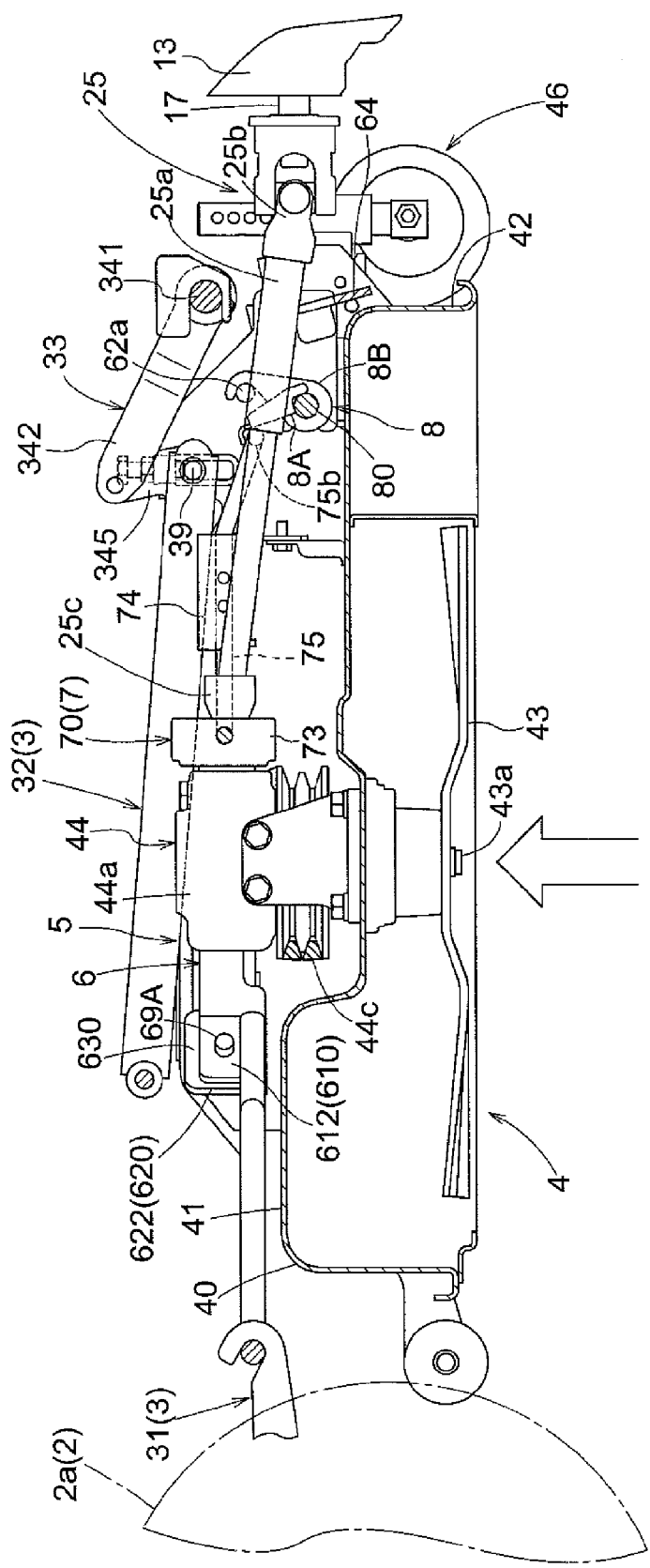
FIG. 14 is a side view showing the mower unit lifted up by the lift link mechanism.
Figure 15:
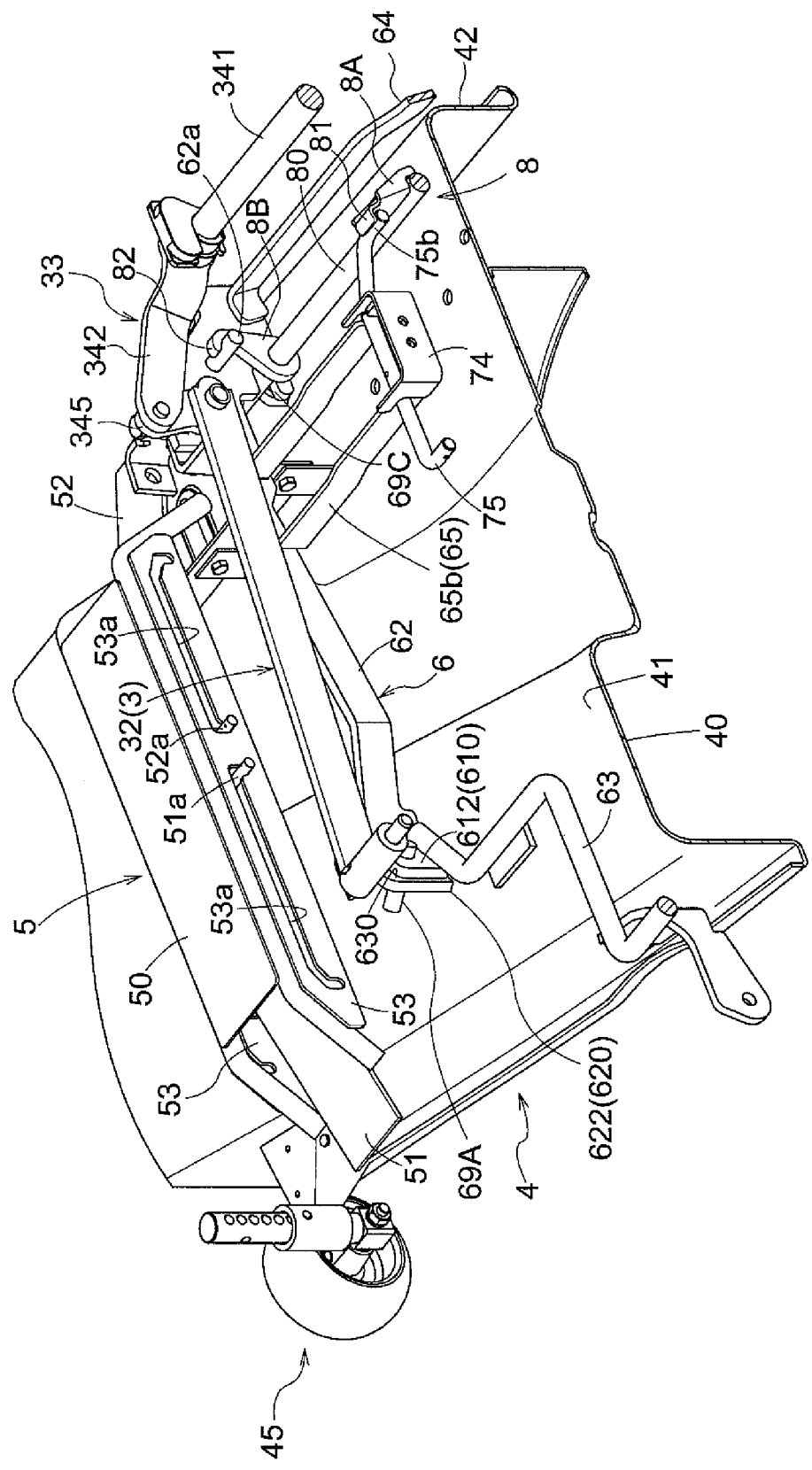
FIG. 15 is a perspective view showing the first locking mechanism and a second locking mechanism.
Figure 16:
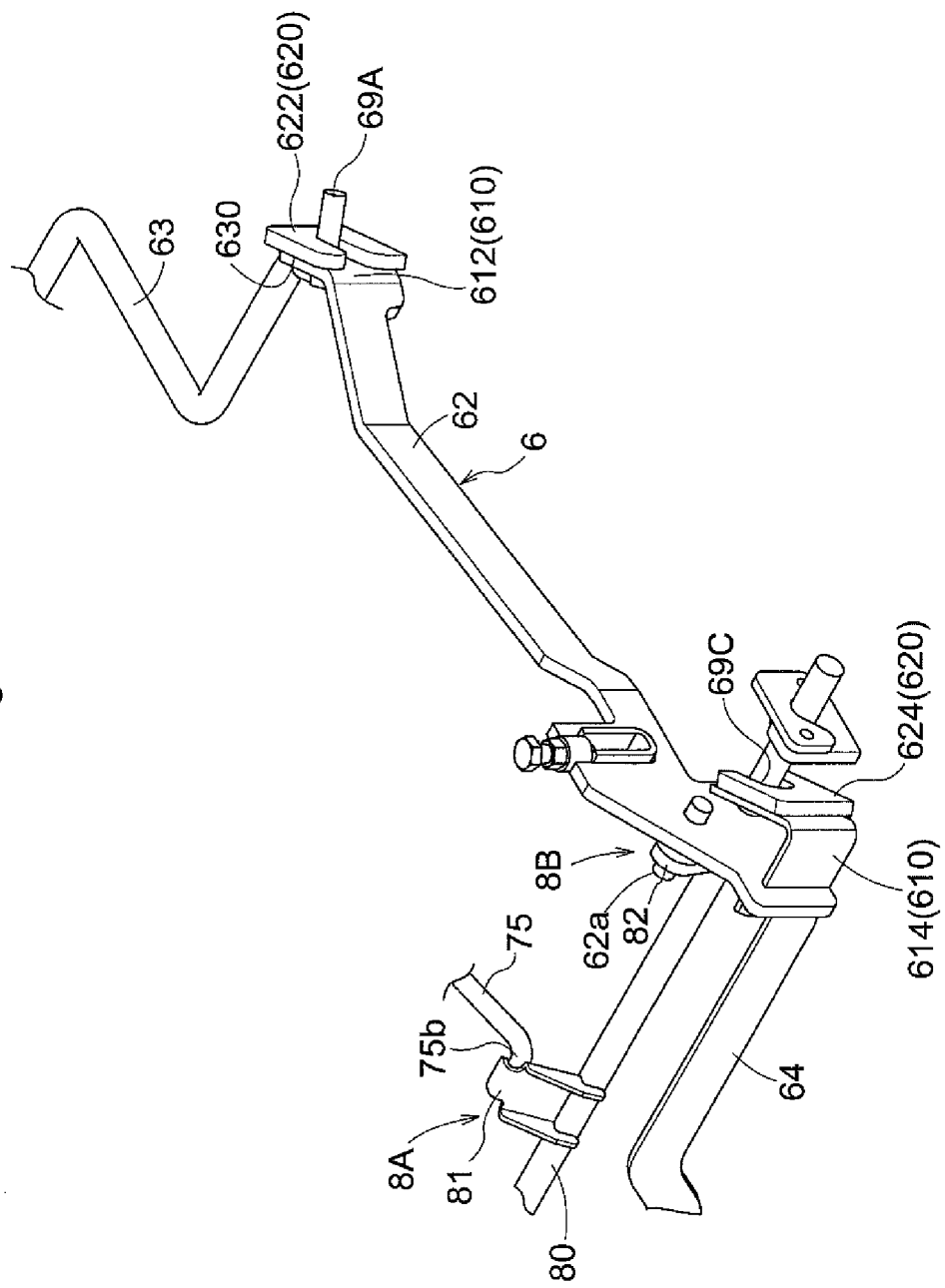
FIG. 16 is a perspective view showing a state in which a portion of connection between the intermediate structure and the blade housing is locked by the first locking mechanism and the second locking mechanism.

After the vehicle body 1 is stopped, the driver operates the operational arm 83 of the locking mechanism 8 to rotate the rotational operation shaft 80 (see FIG. 13 and FIG. 14). In response to this, the arms constituting the first acting portions 81 of the locking mechanism 8 press the rear ends (contacting portions) of the first leg portion 75a and the second leg portion 75b of the power coupling mechanism 7 provided in the intermediate structure 6, thereby to move the coupling holding portion 73 together with the coupling body 70, thus establishing interconnection between the input shaft 44b and the coupling body 70 (see FIG. 16). Simultaneously, the two hook-like arms constituting the second acting portions 82 rotate and surround the pin-like projection 61a provided in the first member 61 and the pin-like projection 62a provided in the second member 62. With this, the final engaged state between the engaging portions 610 and the engaged portions 620 is established. That is, according to the instant embodiment, the vehicle body side first front guide 611 and the mower side first front guide 621, the vehicle body side second front guide 612 and the mower side second front guide 622, the vehicle body side first rear guide 613 and the mower side first rear guide 623, the vehicle body side second rear guide 614 and the mower side second rear guide 624 respectively are rendered to the respective engaged states. These engaged states will be maintained as long as the two hook-like arms as the second acting portions 82 keep pressing the projection 61a and the projection 62a. This engagement retained sate is illustrated in enlargement in FIG. 15. Further, in order to maintain this engaged state, a locking device 84 for locking the rotational operation shaft 80 at its engaging rotational position is provided at the interconnecting position between the operational arm 83 and the rotational operation shaft 80. The construction of this locking device 84 per se is well-known, thus detailed illustration thereof is omitted herein. Referring only briefly thereto, in this embodiment, the rotational operation shaft 80 is locked as a lock pin enters a lock hole at the engaging rotational position. And, as the lock pin moves out of the lock hole, locking of the rotational operation shaft 80 is released. Needless to say, any other locking arrangement can be employed also.

For dismounting the mower unit 4 from the vehicle body 1, the lift link mechanism 3 is lowered so as to place the mower unit 4 onto the ground surface. Then, the driver operates the operational arm 83 of the locking mechanism 8 to rotate the rotational operation shaft 80 of the locking mechanism 8 to a locking release position. In response to this, the connection between the input shaft 44b and the coupling body 70 is released. In succession, the vehicle body 1 is caused to travel in reverse so that the front wheels 2a move above the blade housing 40 to ride over this housing with utilizing the ride-over mechanism 5 from the front side of the mower unit 4. With this reverse traveling, the engaging portions 610 (the four guides 611-614 provided on the front, rear, left and right sides) provided in the intermediate structure 6 move out of the engaged portions 620 (the four guides 621-624 provided on the front, rear, left and right sides) provided in the blade housing 40. After the front wheels 2a have ridden past over the blade housing 40, the mower unit is released, so that this unit can be carried out freely.

Second Embodiment

Figure 17A:
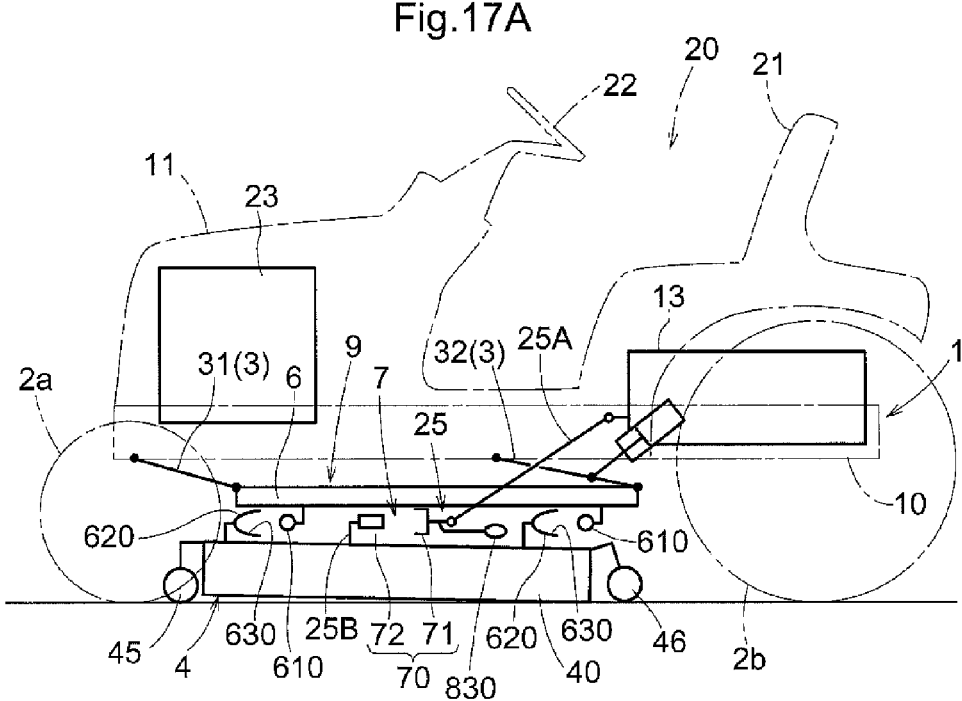
FIG. 17A is a schematic showing the first basic configuration of the mid-mount mower according to the present invention, showing a state immediately before the intermediate structure mower unit 4 is connected to the vehicle body.
Figure 17B:
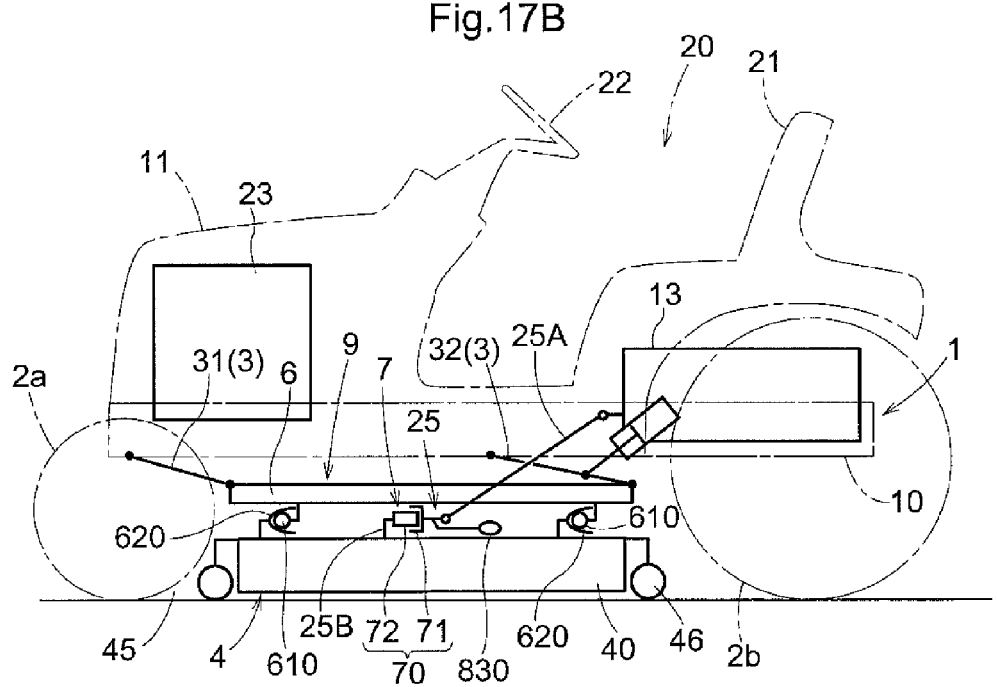
FIG. 17B is a schematic showing the first basic configuration of the mid-mount mower according to the present invention, showing a state in which the intermediate structure mower unit 4 is connected to the vehicle body.

Before a specific configuration of a second embodiment of a mid-mount mower according to the present invention is explained, a basic arrangement characterizing the present invention will be explained with reference to FIG. 17A and FIG. 17B. The arrangement shown in FIGS. 17A and 17B differs from that shown in FIGS. 1A and 1B in that an operational tool 830 is provided in the arrangement shown in FIGS. 1A and 1B. Here, the blade power transmission mechanism (working power transmission mechanism) 25 connectable to and disconnectable from a mower unit side shaft member and a vehicle body side shaft member in order to transmit rotational power of the engine 23 mounted on the mower to the blades 43 mounted to the blade housing 40 is rendered into a connected state for allowing the power transmission by using the operational tool 830.

The coupling body 70 acting as an output shaft of the vehicle body side power transmission mechanism 25A is relatively displaced, preferably linearly moved, between a connecting position realizing interconnection between the machine body side power transmission mechanism 25A and the mower side power transmission mechanism 25B and a releasing position realizing disconnection therebetween. This relative displacement is effected manually with using the operational tool 830. Its operational force can use also a power of an electric motor, an electric cylinder, a hydraulic cylinder, etc. instead of the manual force.

Figure 18:
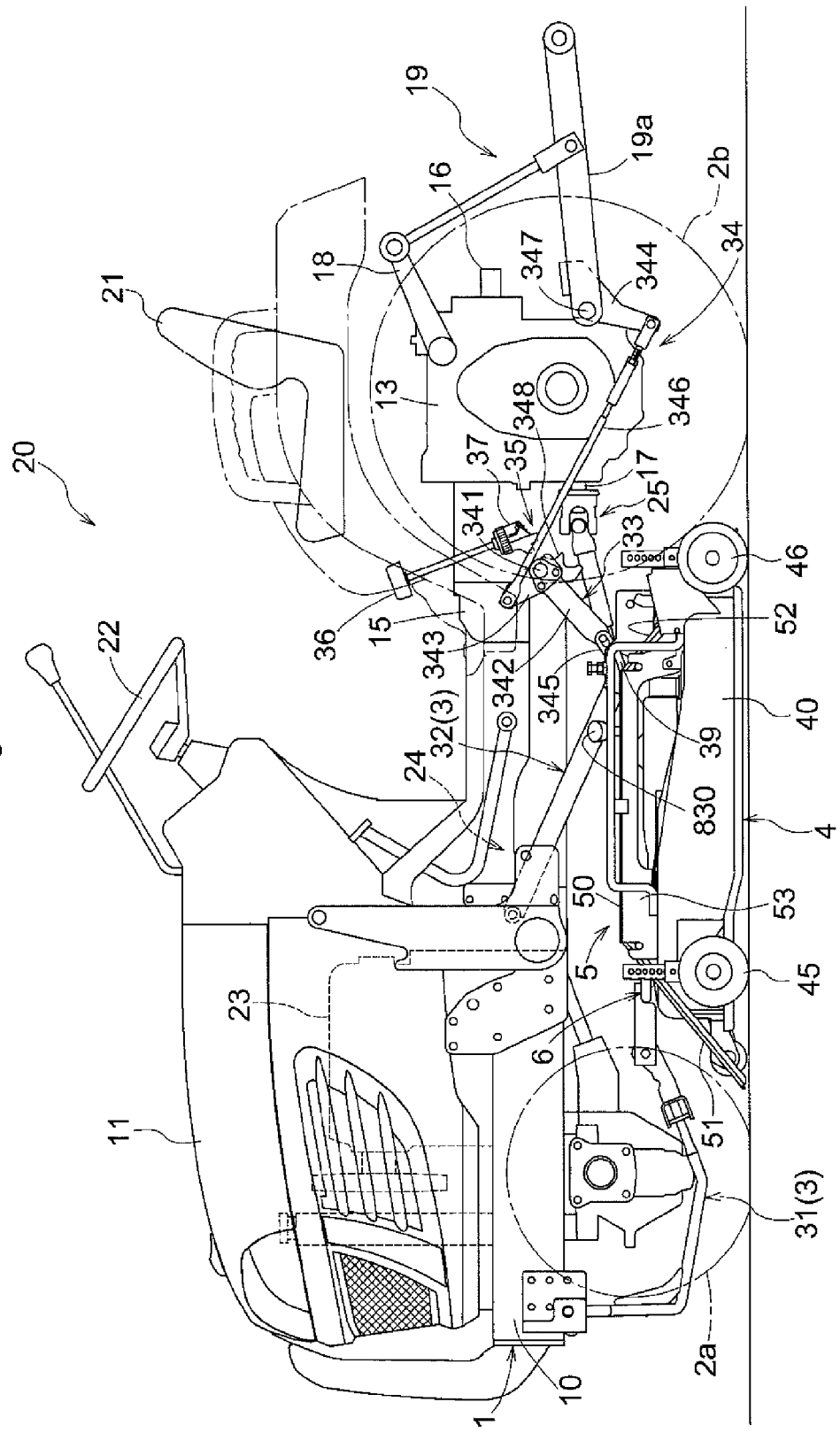
FIG. 18 is a side view showing a mid-mount mower as one of a second embodiment of the present invention.
Figure 20:
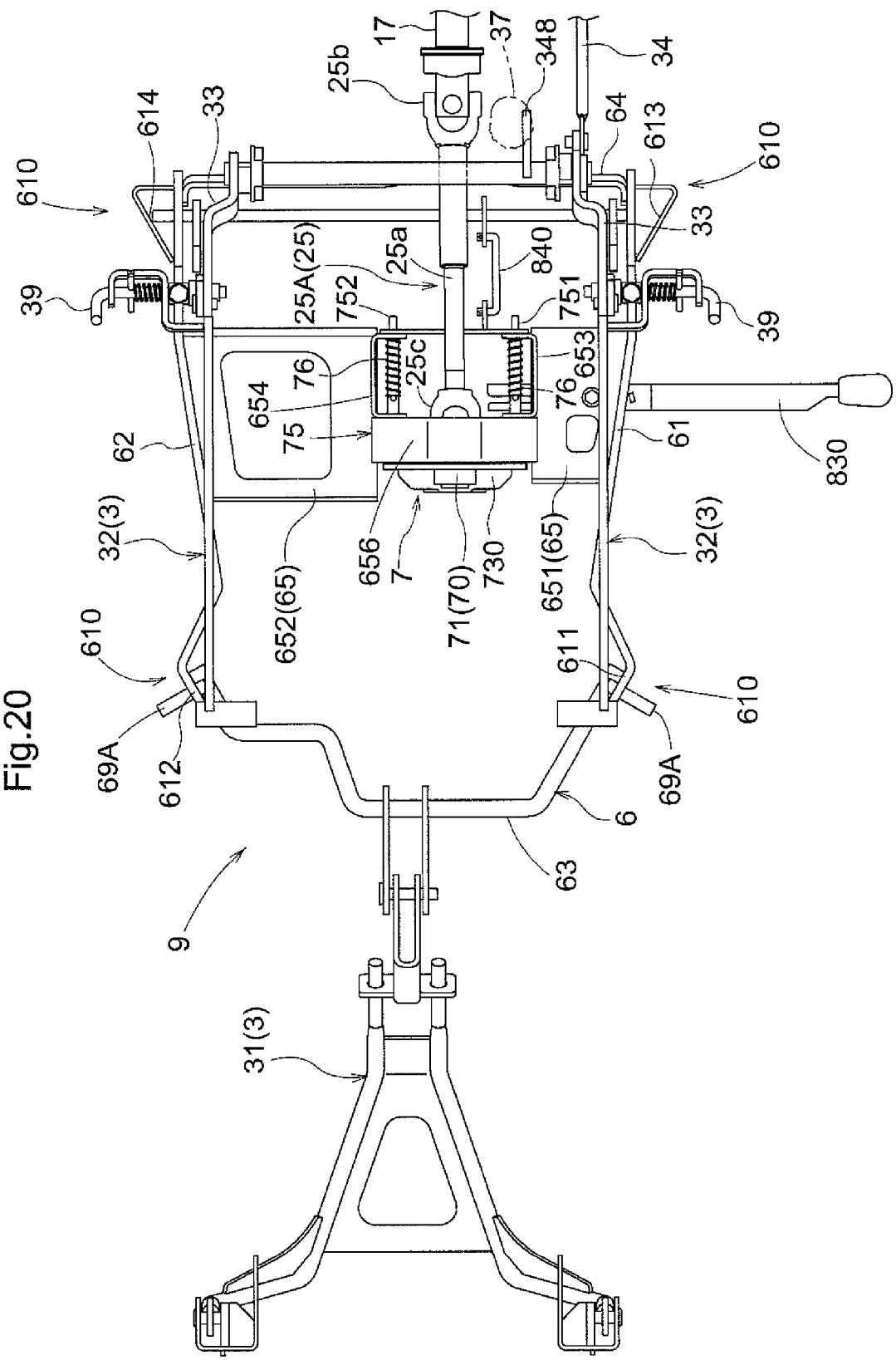
FIG. 20 is a plan view showing a lift link mechanism and an intermediate structure.
Figure 21:
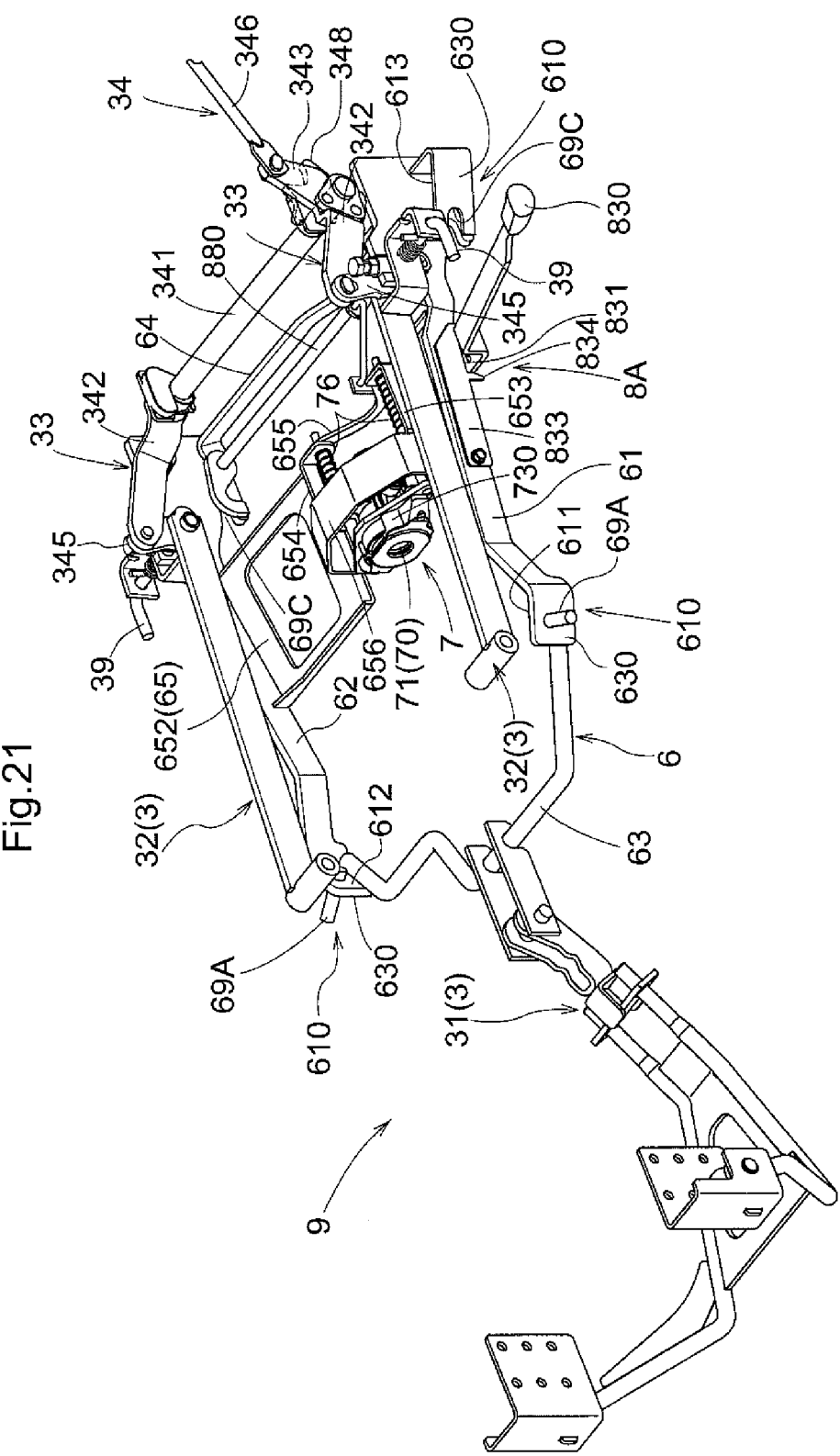
FIG. 21 is a perspective view showing the lift link mechanism and the intermediate structure.
Figure 22:
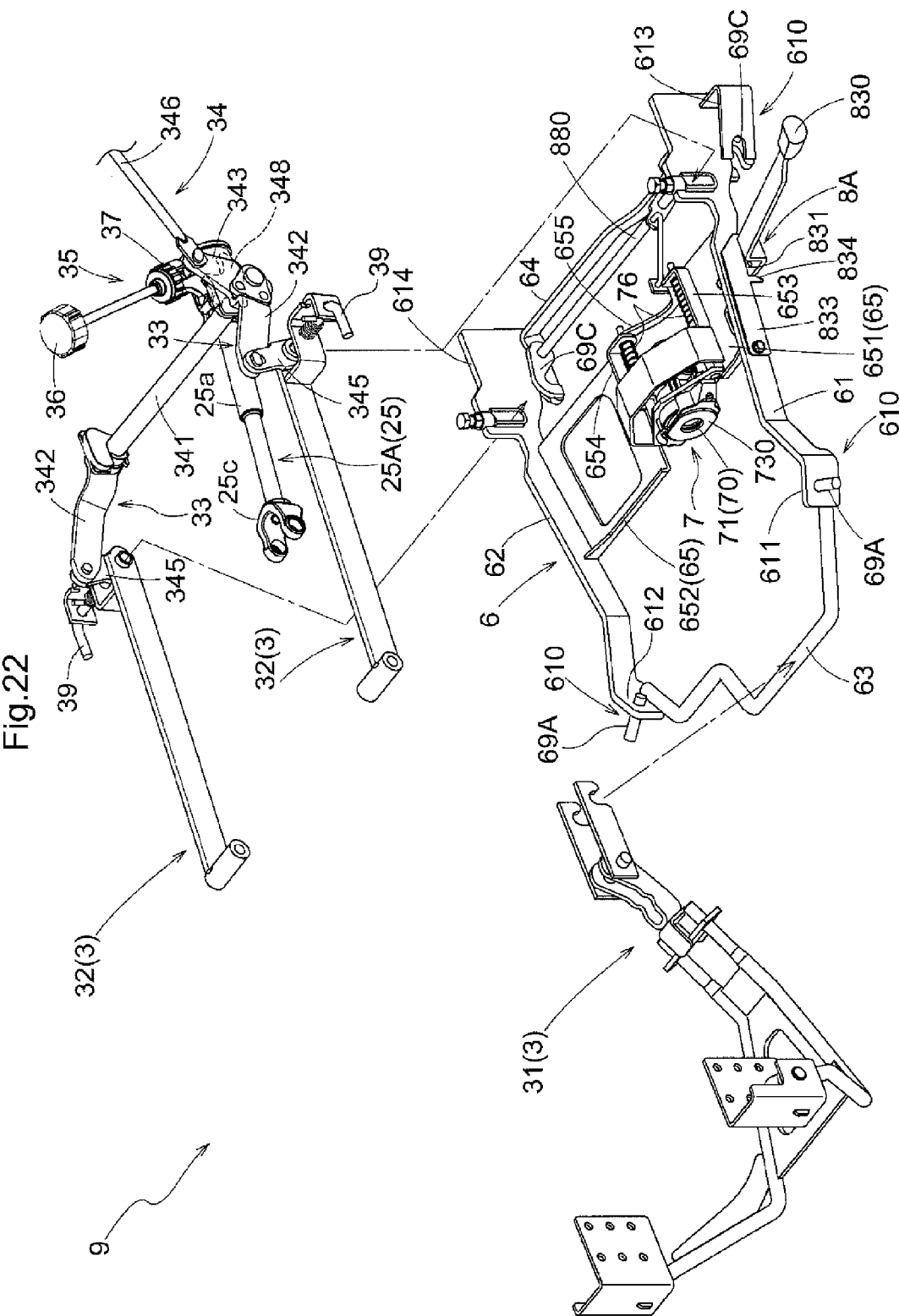
FIG. 22 is an exploded perspective view showing the lift link mechanism and the intermediate structure separately from each other.

Next, with reference to some drawings, one specific configuration as the second embodiment will be explained. FIG. 18 is a side view of a mower. As many parts thereof are identical to those of the first embodiment explained above with reference to FIGS. 1-16, the following explanation will focus on difference from the first embodiment. FIG. 20, FIG. 21 and FIG. 22 show a lift link mechanism 3 and an intermediate structure 6 in the second embodiment. The basic configurations thereof are identical to those of the first embodiment.

Figure 23:
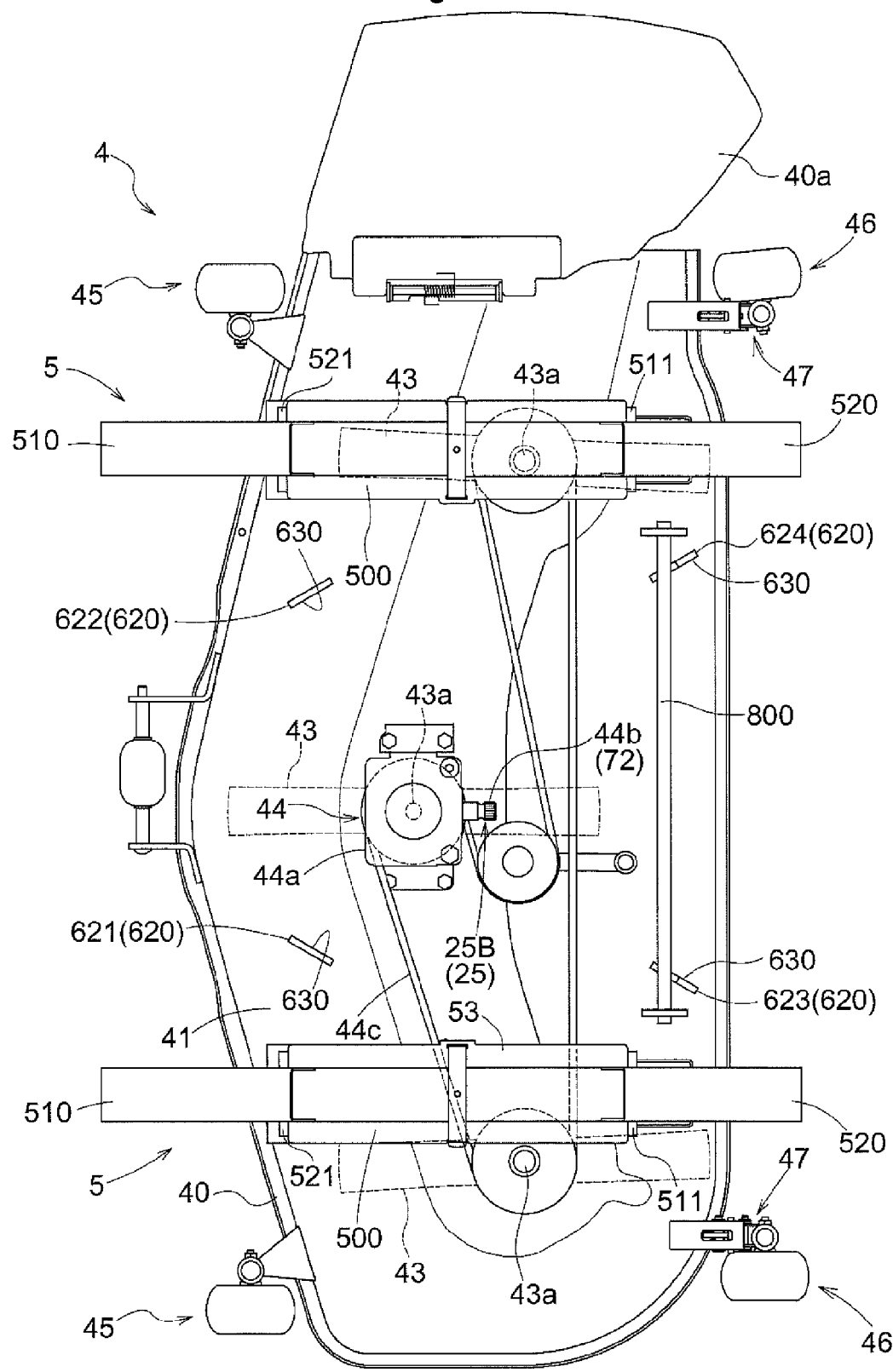
FIG. 23 is a plan view showing the mower unit singly.

As shown in FIG. 23, at a rear region of a top plate 41 of a blade housing 40, a locking fixing rod 800 constituting a first locking mechanism 8B as one example of the locking mechanism 8 to be described in details later extends in the vehicle body traverse direction (traverse direction). A mower side second rear guide 624 and a vehicle body side second rear guide 614 form cutouts for avoiding interference with this locking fixing rod 800.

As shown in FIG. 24 and FIG. 25, FIG. 26 and FIG. 27, a power coupling mechanism 7 includes a coupling body 70 as a second universal joint 25*c*, a coupling holding portion 730 surrounding the coupling body 70 and holding this coupling body 70 via its inner circumferential face, and an attaching unit 75 for attaching this coupling holding portion 730 to the intermediate structure, with allowing displacement of the portion 730 in the vehicle body front/rear direction. The coupling body 70 includes a first connecting end 71 to be connected to the relay shaft 25*a* and a second connecting end 72 to be connected to the input shaft 44*b*. The second connecting end 72 has an inner circumferential face formed with a spline engageable with the spline formed on the input shaft 44*b*. The coupling holding portion 730 is a plate-like boss member having extension pieces at opposed ends thereof. And, the coupling body 70 is fixed within a boss hole of this plate-like boss member. As the coupling holding portion 730 is moved toward the input shaft 44*b* of the power distribution mechanism 44, the input shaft 44*b* and the second connecting end 72 are spline-engaged with each other. The attaching unit 75 is provided for realizing such movement of the coupling holding portion 730.

To the above end, the attaching unit 75 is configured as a slider mechanism for moving the coupling holding portion 730. As a force (e.g. an operational force by a driver) is applied from the outside to this slider mechanism, the coupling holding portion 730 is moved, thus realizing the connection of the power coupling mechanism 7. In this embodiment, in order to cause a translation movement of the coupling holding portion 730, there are provided a first leg portion 751 and a second leg portion 752 as a pair of slider rods, and guide holes as slide guides for the respective slider rods. The first leg portion 751 is configured as a bar-like member fixed to the left side extension of the coupling holding portion 730 and extending rearwards therefrom. The second leg portion 752 is configured as a bar-like member fixed to the right side extension piece of the coupling holding portion 730 and extending rearwards therefrom. The rear ends of the first leg portion 751 and the second leg portion 752 are interconnected via a connecting plate 753. The attaching unit 75 includes, as bases, a first base plate 651 fixed to the first member 61 and a second base plate 652 fixed to the second member 62. To the respect inner edges of the first base plate 651 and the second base plate 652, a first bracket 653 and a second bracket 654 are fixed, respectively. Between the first bracket 653 and the second bracket 654, there is formed a gap allowing passage of the relay shaft 25*a* therethrough. The first bracket 653 and the second bracket 654 respectively is configured as a C-shaped bent plate in its plan view and through holes are formed at its opposed end regions. These through holes function as guide holes for the first leg portion 751 and the second leg portion 752. More particularly, the first leg portion 751 and the second leg portion 752 are inserted in the through holes formed coaxially at the opposed ends of the first bracket 653 and the second bracket 654 and slidably supported to the first bracket 653 and the second bracket 654. An arch-shaped cover 656 is provided for partially covering, from above, the second universal joint 25*c* provided on the relay shaft 25*a* connected to the input shaft 44*b* of the mower side power transmission mechanism 25B. This arch-like cover 656 is shown as being removed in the illustrations of FIG. 26 and FIG. 27, but it is shown as being attached in the illustrations of FIG. 24 and FIG. 25.

Figure 26:
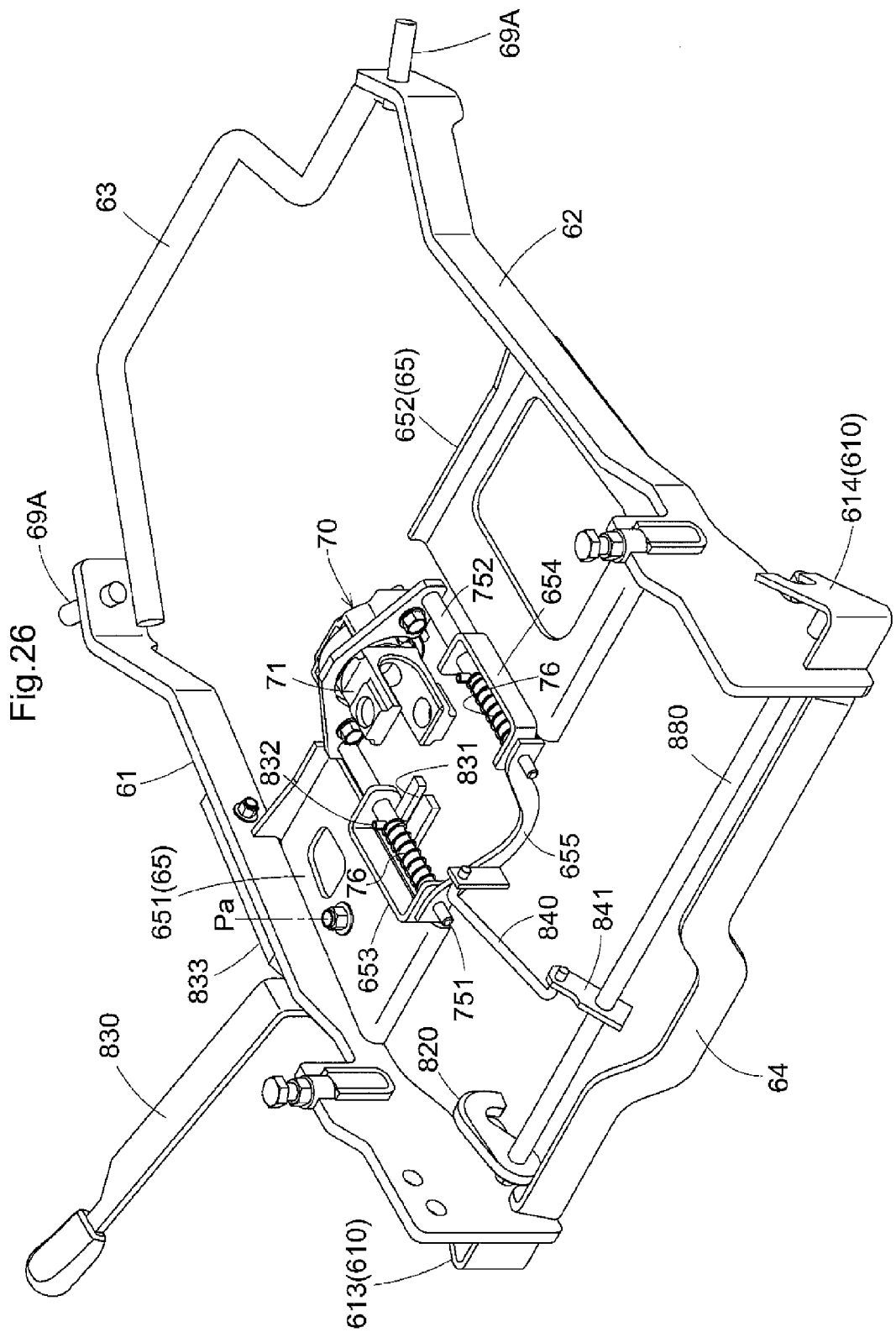
FIG. 26 is a perspective view showing the intermediate structure.

The operational lever 830 selectively providing the connected state and the disconnected state of the power transmission mechanism 7 is configured as an operational lever 830 pivotable about a pivotal vertical axis Pa as shown in FIG. 26, and a slit 831 is formed at one end thereof. And, in this slit 831, a pin 832 fixed to the second leg portion 752 is inserted. Under the interconnected state of the intermediate structure 6 and the blade housing 40, as the operational lever 830 is pivotally operated, the coupling body 70 is moved in the front/rear direction. With this, connection (splined connection) of the coupling body 70 acting as the output shaft of the vehicle body side power transmission mechanism 25A and the input shaft 44*b* or disconnection thereof from the input shaft 44*b* are realized.

Between the first leg portion 751 and the first bracket 653 and also between the second leg portion 752 and the second bracket 654, springs 76 are provided for urging in the direction of releasing the connection of the coupling body 70 held to the coupling holding portion 73 and the input shaft 44*b* of the power distribution mechanism 44. Further, as shown in FIG. 21 and FIG. 22, to the outer face of the first member 61 of the intermediate structure 6, there is fixed a stopper plate 833 configured to hold the operational lever 830 at its pivotal position for interconnecting the coupling body 70 and the input shaft 44*b*. This stopper plate 833 forms a cutout portion 834 which has a substantially same width as the operational lever 830 and which is opened downwards. This cutout portion 834 is configured to maintain the operational lever 830 at the pivotal position for interconnecting the coupling body 70 and the input shaft 44*b*. The operational lever 830 and the cutout portion 834 constitute the first locking mechanism 8A as one of the locking mechanism 8.

Next, there will be explained the locking mechanism 8 for locking mounting of the mower unit 4 to the vehicle body 1. This locking mechanism 8 includes the first locking mechanism 8A for locking the coupling holding portion 73 at the connecting position and the first locking mechanism 8B for locking the engaging portions 610 and the engaged portions 620 at the respective engaged positions. The second locking mechanism 8A and the first locking mechanism 8B are operatively coupled to each other via lock coupling link 840, as may be understood from FIG. 24, FIG. 25 and FIG. 26.

Figure 25:
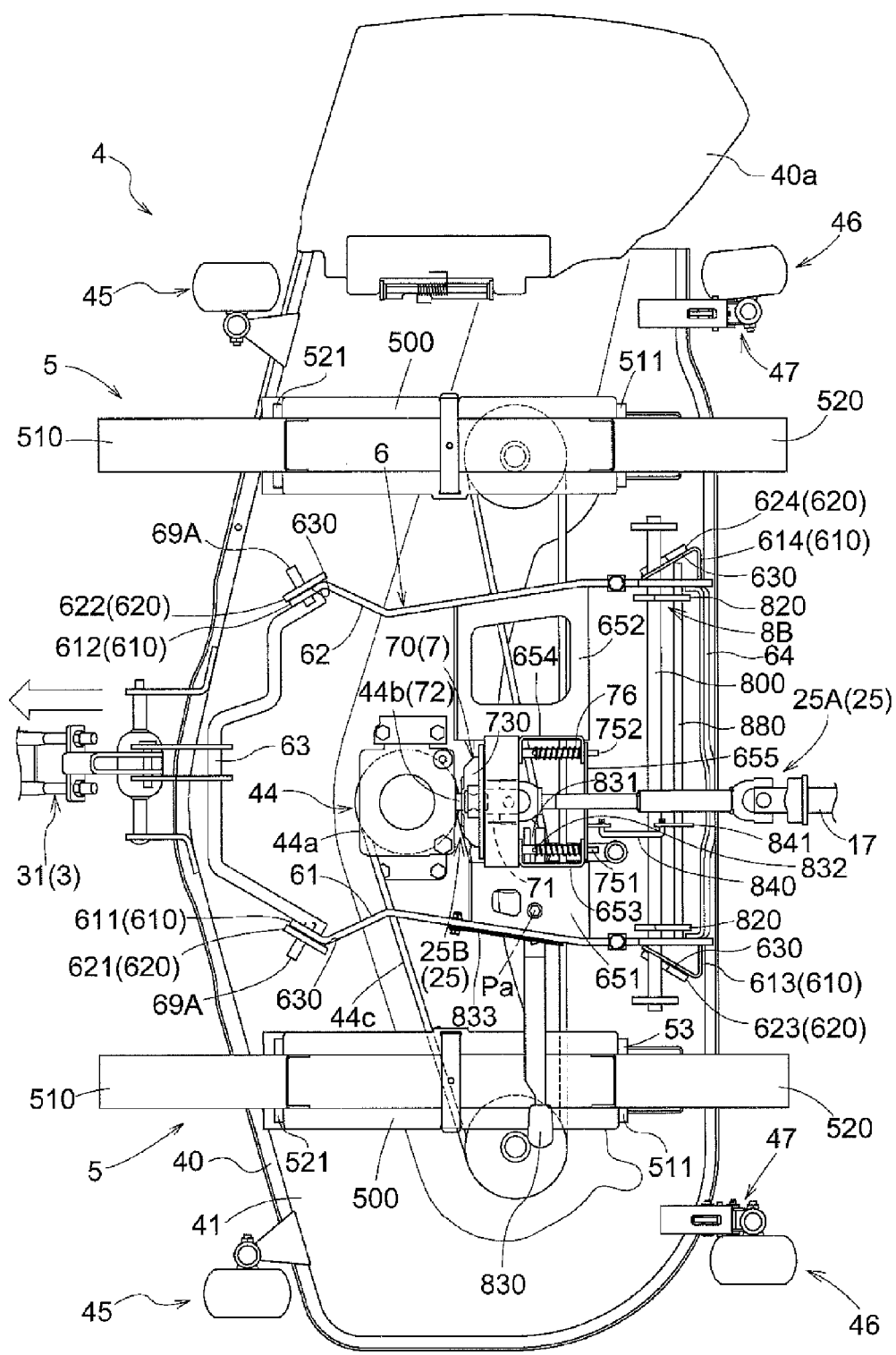
FIG. 25 is a plan view showing the mower unit and the intermediate structure after coupling of the power coupling mechanism.

As shown in FIG. 25 and FIG. 26, between the rear end portion of the first member 61 and the rear end portion of the second member 62 of the intermediate structure 6 and on the front side of the rear connecting member 64 and parallel with this rear connecting member 64, a rotational operation shaft 880 is rotatably mounted. On this rotational operation shaft 880, a pair of left and right locking engagement pieces 820 are fixed with a spacing therebetween. Further, on this rotational operation shaft 880, a connecting arm 841 is fixed. The connecting arm 841 is link-connected to the connecting plate 655 via the lock coupling link 840. With this arrangement, sliding displacements of the first leg portion 751 and the second leg portion 752 are transmitted to the connecting arm 841, whereby the rotational operation shaft 880 is rotated. The locking engagement pieces 820 are configured as hook-like arms, so that in association with rotation of the rotational operation shaft 880, these pieces 820 engage with the lock fixing rod 800 fixed to the blade housing 40.

A pivotal displacement of the operational lever 80 establishing interconnection between the coupling body 70 functioning as the output shaft of the vehicle body side power transmission mechanism 25A and the input shaft 44*b* is converted into a rotational displacement for engaging the locking engagement pieces 820 to the lock fixing rod 800.

Namely, as described above, the operational lever 830 and a slit 844 formed in the stopper plate 833 together constitute the second locking mechanism 8A as one component of the locking mechanism 8, and the locking engagement pieces 820, the lock fixing rod 800 and the lock coupling link 840 together constitute the first locking mechanism 8B.

Figure 19:
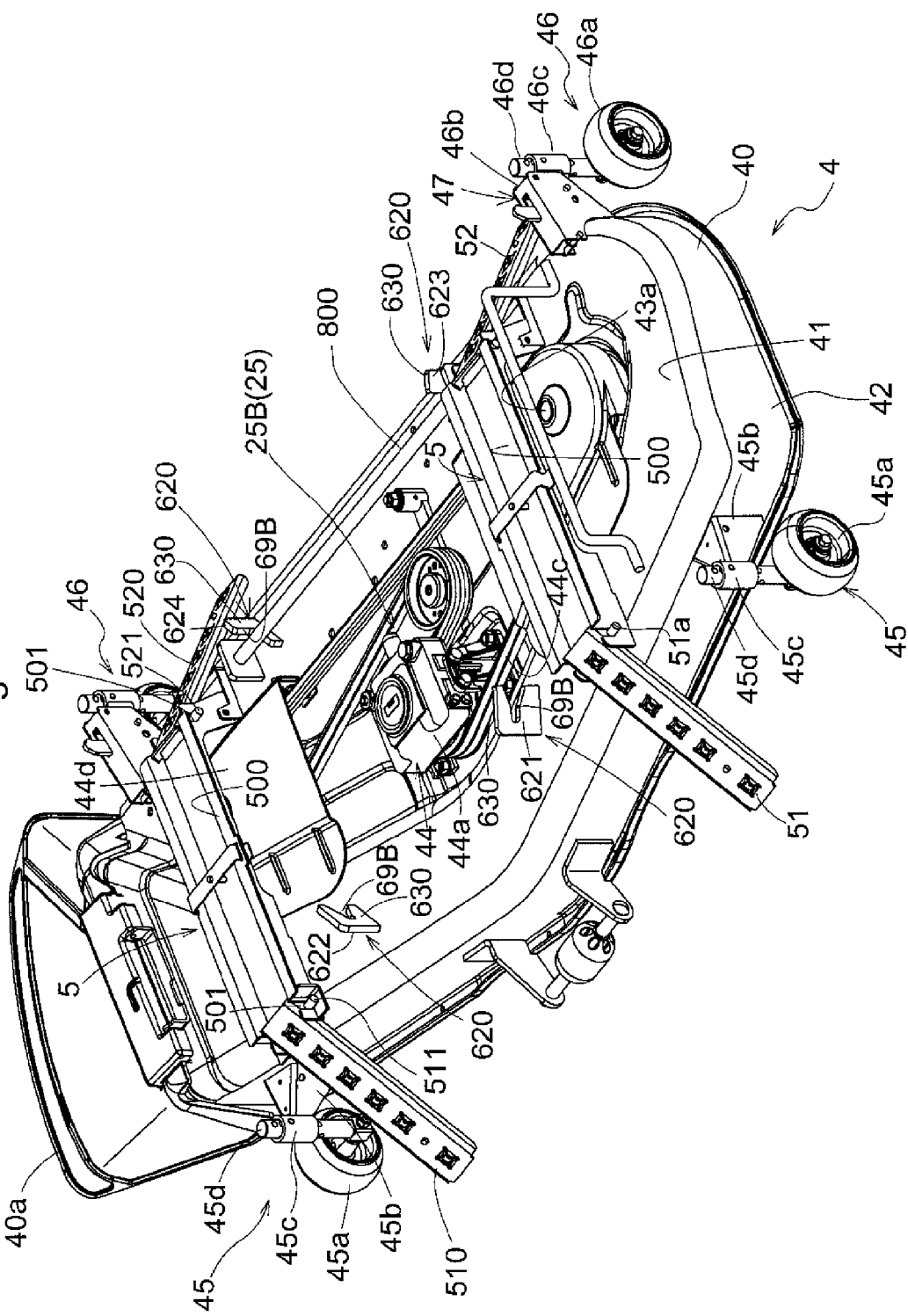
FIG. 19 is a perspective view showing a mower unit.
Figure 24:
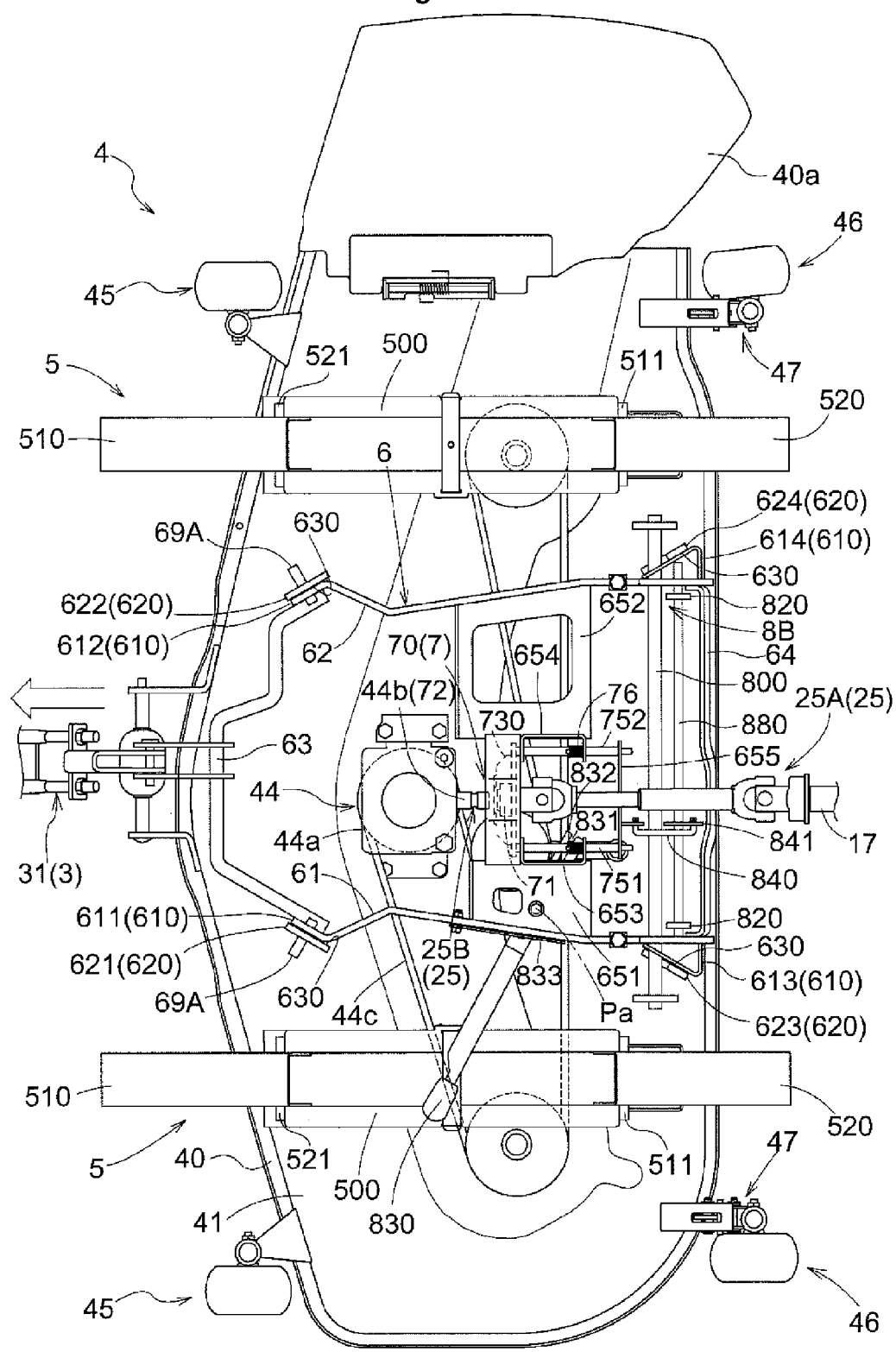
FIG. 24 is a plan view showing the mower unit and the intermediate structure before coupling of a power coupling mechanism.

When the mower unit 4 is to be mounted to the vehicle body 1, the mower is caused to travel forwardly to ride over the mower unit 4 placed laterally on the ground surface. To this end, the blade housing 40 includes a ride-over mechanism 5. This ride-over mechanism 5, as shown in FIG. 19 and FIG. 24, is provided for each one of the left and right front wheels 2a. And, the distance between the mechanisms 5 corresponds to the front-wheel tread width. Each ride-over mechanism 5 includes a bridge portion 500 extending along the front/rear direction upwardly of the belt transmission mechanism 44c mounted to the top plate 41 of the blade housing 40, a front auxiliary plate 510 extending with an inclination from the front end of the bridge portion 500 toward the ground surface, and a rear auxiliary plate 520 extending with an inclination from the rear end of the bridge portion 500 toward the ground surface. The bridge portion 500 consists of a pair of arch-shaped frames having a flat intermediate portion and its cross section is formed like an upwardly opened channel. When not in use, the front auxiliary plate 510 and the rear auxiliary plate 520 are retracted and stored within the bridge portion 500. The front auxiliary plate 510 and the second auxiliary plate 520 respectively include, at one end thereof, pins 511 and 521 projecting in the traverse direction. And, at front end and rear end of the bridge portion 500, there are formed cutouts 501 for receiving these pins 511 and 521. At the time of riding-over of the front wheels 2a, the front auxiliary plate 510 and the rear auxiliary plate 520 are inclined to orient their pins 511 and 521 upwards and these pins 511, 521 are inserted into the cutouts 501. At the time of storage, the orientations of the front auxiliary plate 510 and the rear auxiliary plate 520 are reversed and these plates 510 and 520 are stored within the bridge portion 500 and also the pins 511 and 521 are inserted into the cutouts 501.

Firstly, for mounting the mower unit 4 to the lower body portion of the tractor, the intermediate structure 6 is lowered in advance to its lower limit position by an operation of the lift link mechanism 3. In succession, the vehicle body 1 is caused to travel forwardly so that the front wheels 2a move above the blade housing 40 to ride over this housing with utilizing the ride-over mechanism 5 from the rear side of the mower unit 4. When the front wheels 2a have passed over the blade housing 40, the engaging portions 610 (the four guides 611-614 provided on the front, rear, left and right sides) provided in the intermediate structure 6 come into engagement with the engaged portions 620 (the four guides 621-624 provided on the front, rear, left and right sides) provided in the blade housing 40. More particularly, the engaging pins 69A provided in the vehicle body side first front guide 611 and the vehicle body side second front guide 612 are guided by the respective guide faces 630 and enter the elongate slots 69B provided in the mower side first front guide 621 and the mower side second front guide 622. In the course of this, the vehicle body side first rear guide 613 and the vehicle body side second rear guide 614 come into face contact with the mower side first rear guide 623 and the mower side second rear guide 624, respectively and move into the regions restricted by these mower side first rear guide 623 and mower side second rear guide 624.

When the front wheels 2a have moved above the blade housing 40 to ride over this housing with utilizing the ride-over mechanism 5 from the rear side of the mower unit 4, the vehicle body 1 is stopped. At this point, on the axis of the input shaft 44b extending rearwards in the vehicle body front/rear direction of the power distribution mechanism 44 of the mower unit 4, the axis of the coupling body 70 of the power coupling mechanism 7 provided in the intermediate structure 6 is positioned. Thus, the input shaft 44b and the coupling body 40 are aligned on the same axis in the vehicle body front/rear direction.

After stopping of the vehicle body 1, the driver pivotally operates the operational lever 830 to engage this operational lever 830 into the slit 831. This pivotal displacement, on one hand, realizes interconnection between the coupling body 70 functioning as an output shaft of the vehicle body side power transmission mechanism 25A and the input shaft 44b, and this state is maintained by the function of the second locking mechanism 8A and the above displacement realizes, on the other hand, engagement of the locking engagement piece 820 to the locking fixing rod 800, and this state is maintained by the function of the first locking mechanism 8B.

For dismounting the mower unit 4 from the vehicle body 1, the lift link mechanism 3 is lowered so as to place the mower unit 4 onto the ground surface. Then, the driver operates the operational lever 830 to remove it from the slit 831. The operational lever 830 disengaged from the slit 831 is pivoted to its home position by the resilience of the spring 76. This pivotal displacement realizes, on one hand, disconnection between the coupling body 70 functioning as an output shaft of the vehicle body side power transmission mechanism 25A and the input shaft 44b, and realizes, on the other hand, disengagement of the locking engagement piece 820 from the locking fixing rod 800. As a result, the interconnection between the blade housing 40 and the intermediate structure 6 is released. Further, the vehicle body 1 is caused to travel in reverse so that the front wheels 2a move above the blade housing 40 to ride over this housing with utilizing the ride-over mechanism 5 from the front side of the mower unit 4. With this reverse traveling, the engaging portions 610 provided in the intermediate structure 6 move out of the engaged portions 620 provided in the blade housing 40. After the front wheels 2a have ridden past over the blade housing 40, the mower unit 4 is released, so that this unit can be carried out freely.

Other Embodiments

[1] The engagement arrangement for interconnecting the intermediate structure 6 and the blade housing 40, consisting of the engaging portions 610 included in the intermediate structure 6 and the engaged portions 620 included in the blade housing 40 can be of any other engagement arrangement form than the hole-pin engagement described above, e.g. pawl engagement arrangement, as long as such other arrangement too realizes engagement in association with approaching in the vehicle body front/rear direction with forward traveling of the vehicle body 1 and disengagement in association with departing in the vehicle body front/rear direction with reverse traveling of the vehicle body 1. Further alternatively, these different engagement arrangements can be used in combination. Also, in the foregoing embodiment, the number of the engaging connecting points created by the engaging portions 610 and the engaged portions 620 was four. However, it can be any number of two or more.

[2] In the foregoing embodiment, mutually contacting plate faces of the vehicle body side first front guide 611 and the mower side first front guide 621 were used as the guide faces 630; and mutually contacting plate faces of the vehicle body side second front guide 612 and the mower side second front guide 622 were used as the guide faces 630. Instead, separate members can be provided for creating these guide faces 630. Further, in the foregoing, the rotational operation shaft 80 of the locking mechanism 8 was employed as an engaging pin to come into engagement with the elongate slots 69C provided in the vehicle body side first rear guide 613 and the vehicle body side second rear guide 614. Instead, a separate engaging pin dedicated to this end can be provided in the blade housing 40.

[3] The mower unit 4 can be configured as a rear-discharge type in which grass clippings are discharged rearwards from a discharge opening formed at the rear end of the blade housing 40. Further alternatively, the mower unit 4 can be mulching type in which grass clippings cut by the blade are minced while being circulated inside the blade housing 40 and then dropped through an opening formed in the bottom of the blade housing 40 onto the ground surface. Furthermore, the number of blades to be provided in the mid-mount mower unit 4 and the transmission arrangement for the blade can vary in many ways.

Figure 27:
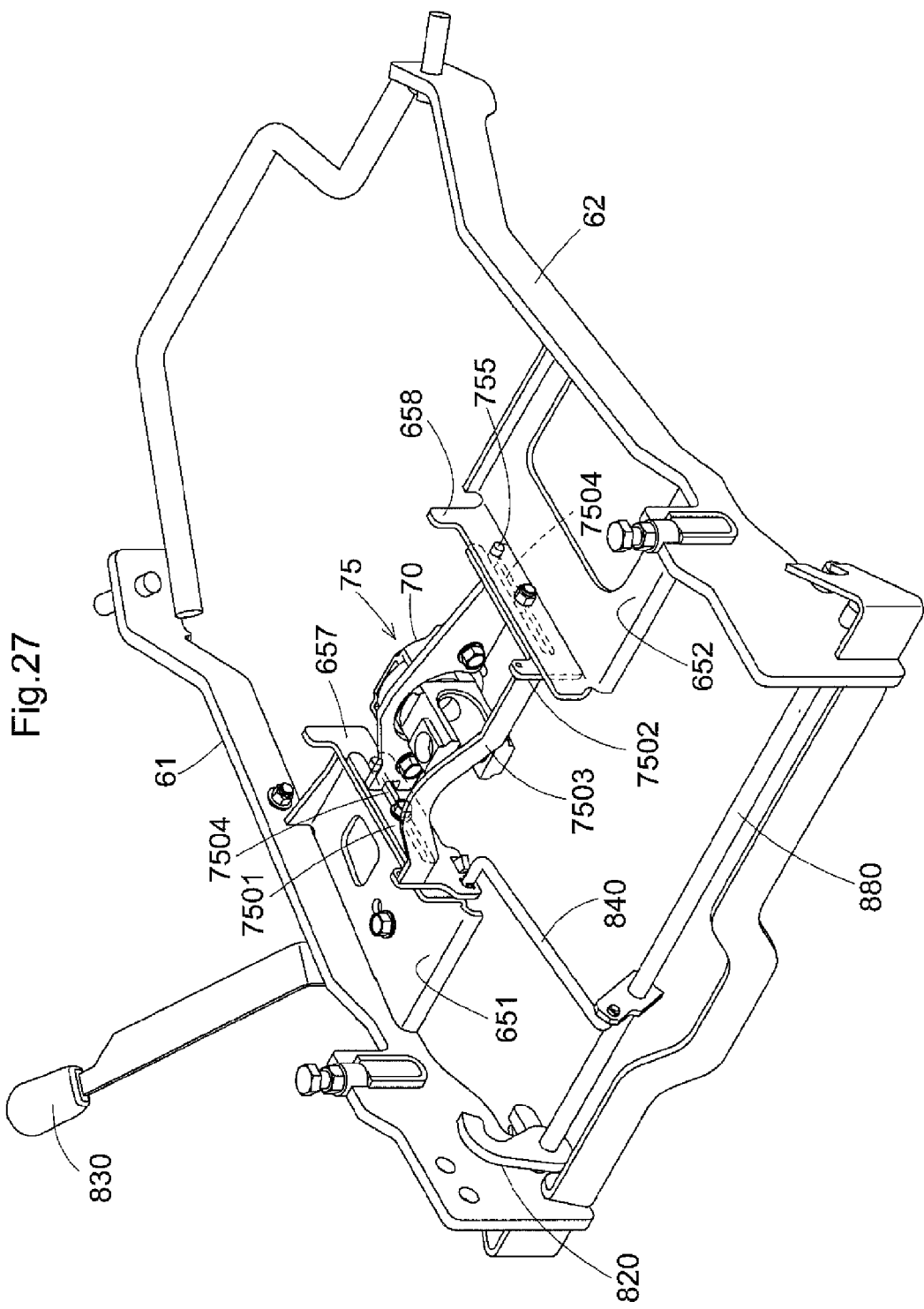
FIG. 27 is a perspective view showing a variation of an attaching unit provided in the intermediate structure.
Figure 28:
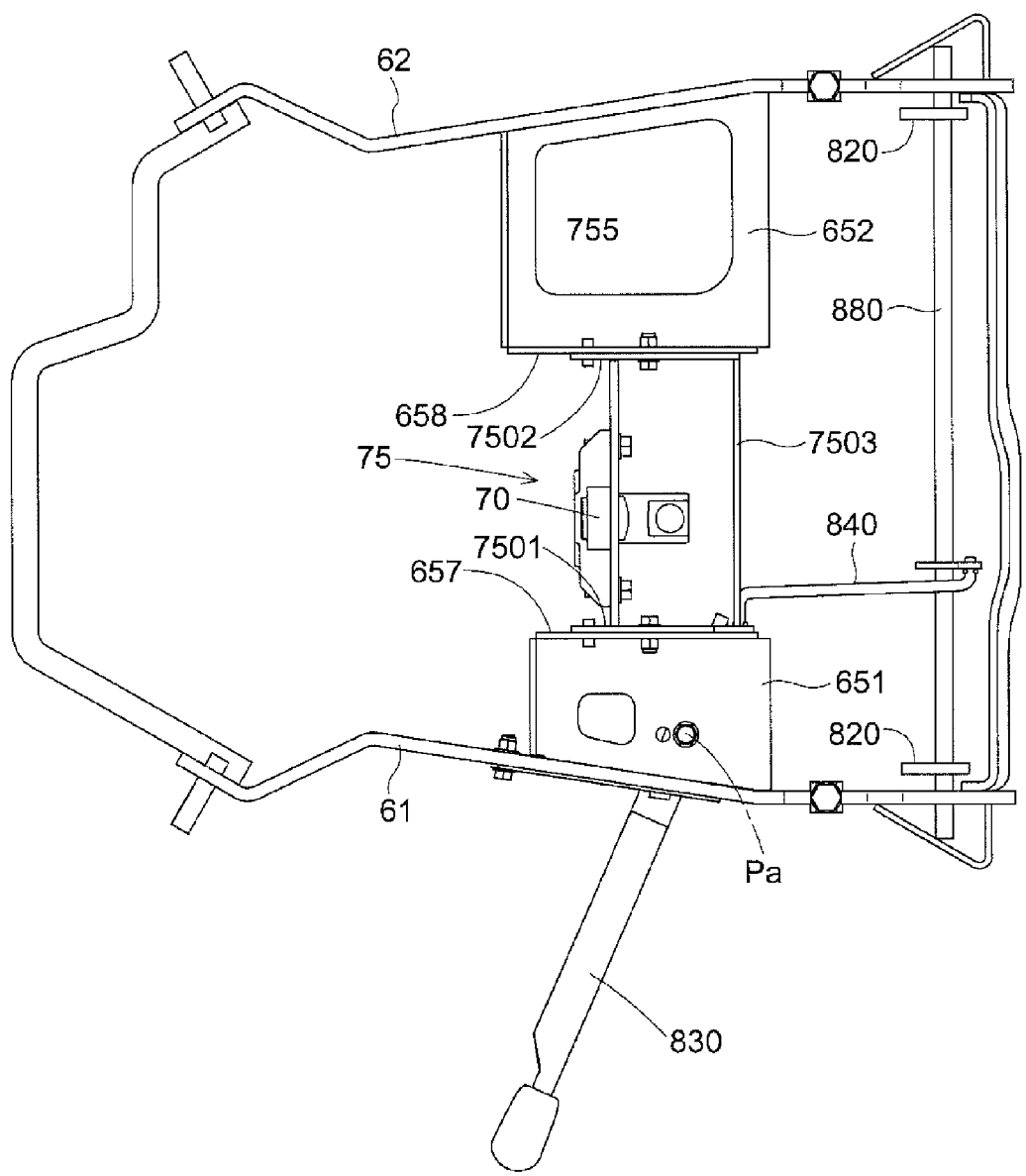
FIG. 28 is a plan view showing the intermediate structure shown in FIG. 27.

[4] FIG. 27 and FIG. 28 show a further embodiment of an attaching unit 75 configured to move the coupling body 40 back and forth. In this further embodiment, instead of the first leg portion 751 and the second leg portion 752, a first side plate 7501 and a second side plate 7502 are fixed to the opposed ends of the coupling holding portion 73 and extending in the front/rear direction. End portions of the first side plate 7501 and the second side plate 7502 corresponding to the coupling holding portion 73 are interconnected via an interconnecting plate 7503. Further, the first base plate 651 forms a first guide plate 657 instead of the first bracket 653 and the second base plate 652 forms a second guide plate 658 instead of the second bracket 654. The first guide plate 657 is fixed in position so as to contact the first side plate 7501, and the second guide plate 658 is fixed in position so as to contact the second side plate 7502. The first side plate 7501 and the second side plate 7502 respectively form guide grooves 7504 extending in the front/rear direction, whereas the first guide plate 657 and the second guide plate 658 respectively include guide pins 755 engageable into the guide grooves 7504 respectively. That is, with a guiding function of the guide grooves 7504 and the guide pins 755, the coupling body 70 is moved back and forth. The leading end of the operational lever 830 is connected to the first side plate 7501. In response to a pivotal displacement of the operational lever 830, the first side plate 7501 and the second side plate 7502, eventually, the coupling body 70, are (is) moved back and forth. The lock coupling link 840 too is connected to the first side plate 7501.

The present invention is applicable to a mower detachably mounting, between front wheels and rear wheels, a mower unit 4 of various types configured to be capable of being ridden over by the left and right front wheels. The configurations of the lift link mechanism and the mower unit 4 are not particularly limited in the present invention.

The invention claimed is:

1. A mid-mount mower having a mower unit mounted under a vehicle body between front wheels and rear wheels, the mower comprising:
    a lift link mechanism having a front link and a rear link provided in the vehicle body and spaced apart from each other in a vehicle body front/rear direction;
    a blade housing having an engaged portion engageable with an engaging portion provided in the vehicle body in association with a movement of the vehicle body in the vehicle body front/rear direction;
    a blade power transmission mechanism having a vehicle body side power transmission mechanism and a mower side power transmission mechanism as units separate from each other and having also a power coupling mechanism for coupling an output shaft of the vehicle body side power transmission mechanism with an input shaft of the mower side power transmission mechanism;
    a coupling operational tool for establishing coupling between the input shaft and the output shaft by displacing the power coupling mechanism in the vehicle body front/rear direction in a connection state for establishing engagement between the engaging portion and the engaged portion; and
    a first locking mechanism for locking the engaging portion and the engaged portions at the mutually engaged position;
    wherein the first locking mechanism includes a locking engagement piece pivotally supported to the vehicle body and a locking link for pivoting the locking engagement piece; and
    the engaging portion and the engaged portion are locked when the locking engagement piece comes into engagement with the blade housing in association with a pivotal movement of the locking engagement piece; and
    wherein a displacement of the operational tool is transmitted to the locking link and the locking link converts this displacement of the operational tool into a displacement of the locking engagement piece.

2. The mower according to claim 1, wherein the power coupling mechanism includes a coupling body having a first coupling end to be connected to the output shaft and a second coupling end to be detachably connected to the input shaft, a coupling holding portion for holding the coupling body, and an attaching unit for attaching the coupling holding portion to the vehicle body while allowing displacement of the coupling holding portion in the vehicle body front/rear direction via the coupling operational tool.

3. The mower according to claim 2, wherein the attaching unit supports the coupling holding portion such that the coupling holding portion can move linearly between a connecting position realizing connection between the second coupling end and the input shaft and a releasing position realizing release of the connection of the second coupling end to the input shaft.

4. The mower according to claim 3, wherein the coupling operational tool is pivotally supported to the attaching unit and the coupling holding portion is moved linearly in association with a pivotal displacement of the coupling operational tool.

5. The mower according to claim 1, wherein a second locking mechanism is provided for locking the connection between the input shaft and the output shaft.

6. The mower according to claim 5, wherein the second locking mechanism locks the coupling operational tool at an operational position for connecting the input shaft to the output shaft.

7. A mid-mount mower having a mower unit mounted under a vehicle body between front wheels and rear wheels, the mower comprising:
    a lift link mechanism having a front link and a rear link provided in the vehicle body and spaced apart from each other in a vehicle body front/rear direction;

a blade housing having an engaged portion engageable with an engaging portion provided in the vehicle body in association with a movement of the vehicle body in the vehicle body front/rear direction;

a blade power transmission mechanism having a vehicle body side power transmission mechanism and a mower side power transmission mechanism as units separate from each other and having also a power coupling mechanism for coupling an output shaft of the vehicle body side power transmission mechanism with an input shaft of the mower side power transmission mechanism;

a coupling operational tool for establishing coupling between the input shaft and the output shaft by displacing the power coupling mechanism in the vehicle body front/rear direction in a connection state for establishing engagement between the engaging portion and the engaged portion; and an intermediate structure connected via a pivot axis to one end of the front link and one end of the rear link;

wherein the engaging portion and the vehicle body side power transmission mechanism are provided in the intermediate structure.

8. The mower according to claim 7, wherein the intermediate structure includes a first member and a second member which extend in the vehicle body front/rear direction with forming a space therebetween, a front connecting member interconnecting front portions of the first member and the second member, and a rear connecting member interconnecting rear portions of the first member and the second member; and a plurality of the engaging portions are formed at opposed ends of the first member and at the opposed ends of the second member.

9. The mower according to claim 8, wherein the engaging portion and the engaged portion are provided as a hole-pin engagement arrangement including an elongate slot extending in the vehicle body front/rear direction and opened in a vehicle body rear direction and an engaging pin engageable into the elongate slot.

10. The mower according to claim 7, wherein a guide face is provided to guide the engaging portion and the engaged portion to an engaging position in association with movement of the vehicle body in the vehicle body front/rear direction so as to establish connection between the blade housing placed on a ground surface and the intermediate structure.

11. The mower according to claim 10, wherein the guide face includes inclined faces formed in the engaging portion and the engaged portion.

\* \* \* \* \*